United States Patent
Fu et al.

(10) Patent No.: US 12,062,249 B2
(45) Date of Patent: Aug. 13, 2024

(54) SYSTEM AND METHOD FOR GENERATING IMAGE LANDMARKS

(71) Applicant: Northeastern University, Boston, MA (US)

(72) Inventors: Yun Fu, Brookline, MA (US); Bin Sun, Boston, MA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 17/045,902

(22) PCT Filed: May 2, 2019

(86) PCT No.: PCT/US2019/030496
§ 371 (c)(1),
(2) Date: Oct. 7, 2020

(87) PCT Pub. No.: WO2019/213459
PCT Pub. Date: Nov. 7, 2019

(65) Prior Publication Data
US 2021/0158023 A1     May 27, 2021

Related U.S. Application Data

(60) Provisional application No. 62/666,849, filed on May 4, 2018.

(51) Int. Cl.
    *G06T 7/00*     (2017.01)
    *G06F 18/21*     (2023.01)
    (Continued)

(52) U.S. Cl.
    CPC ............ *G06V 40/165* (2022.01); *G06F 18/21* (2023.01); *G06N 3/04* (2013.01); *G06T 7/50* (2017.01);
    (Continued)

(58) Field of Classification Search
    CPC ............... G06V 40/165; G06V 10/454; G06V 40/171; G06F 18/21; G06N 3/04;
    (Continued)

(56) References Cited

U.S. PATENT DOCUMENTS

2016/0314619 A1* 10/2016 Luo ..................... G06T 7/344
2019/0019014 A1* 1/2019 Ye ...................... G06V 40/169
(Continued)

FOREIGN PATENT DOCUMENTS

WO     2019213459 A1     11/2019

OTHER PUBLICATIONS

Adrian Bulat et al: "How far are we from solving the 2D & 3D Face Alignment problem? (and a dataset of 230,000 3D facial lanmdarks )", Arxiv.Org, Cornell University Library, 201 Olin Library Cornell University Ithaca, NY 14853, Mar. 21, 2017 (Mar. 21, 2017), XP081292846,DOI:10.1109/ICCV.2017.116sect.1, 4; figures 1-4.
(Continued)

*Primary Examiner* — Ping Y Hsieh
(74) *Attorney, Agent, or Firm* — Hamilton, Brook, Smith & Reynolds, P.C.

(57) ABSTRACT

A system, neural network, and corresponding method generate 3D landmarks associated with an object in a 2D image. An embodiment is a system comprising a neural network detector configured to produce planar coordinates of landmarks at points of the object in the 2D image and a depth coordinate estimator. The planar coordinates include planar coordinate pairs. The depth coordinate estimator is configured to receive the 2D image and the planar coordinates and to estimate a depth coordinate for each planar coordinate pair of each landmark to generate the 3D landmarks. The system reduces network parameters from MB to KB and has better performance relative to state-of-the-art methods. The system may be configured to apply the 3D landmarks for
(Continued)

face alignment, virtual face makeup, face recognition, eye gaze tracking, face synthesis, or other face related application.

31 Claims, 13 Drawing Sheets

(51) Int. Cl.
   *G06N 3/04* (2023.01)
   *G06T 7/50* (2017.01)
   *G06T 7/70* (2017.01)
   *G06V 10/44* (2022.01)
   *G06V 40/16* (2022.01)

(52) U.S. Cl.
   CPC .............. *G06T 7/70* (2017.01); *G06V 10/454* (2022.01); *G06V 40/171* (2022.01); *G06T 2207/20084* (2013.01); *G06T 2207/30201* (2013.01)

(58) Field of Classification Search
   CPC .......................... G06T 7/50; G06T 7/70; G06T 2207/20084; G06T 2207/30201
   See application file for complete search history.

(56) References Cited

U.S. PATENT DOCUMENTS

| | | | |
|---|---|---|---|
| 2019/0114824 A1* | 4/2019 | Martinez | .............. G06V 40/171 |
| 2022/0156554 A1 | 5/2022 | Fu et al. | |

OTHER PUBLICATIONS

Adrian Bulat et al: "Binarized Convolutional Landmark Localizers for Human Pose Estimation and Face Alignment with Limited Resources", Arxiv.Org, Cornell University Library, 201 Olin Library Cornell University Ithaca, NY 14853, Mar. 2, 2017 (Mar. 2, 2017), XP081291548, Doi: 10.1109 ICCV.2017.400 sect. 1, 4, 5.
Eugenio Culurciello: "Neural Network Architectures—Towards Data Science", Mar. 23, 2017 (Mar. 23, 2017), XP055611615, Retrieved from the Internet: URL:https://towardsdatascience.com/neural-network-architectures-156e5bad5lba [retrieved on Aug. 7, 2019] sect. Xception, MobileNets.
Bendersky Eli: "Depthwise separable convolutions for machine learning—Eli Bendersky's website", Apr. 4, 2018 (Apr. 4, 2018), XP055612171, Retrieved from the Internet: URL:https://eli. thegreenplace.net/2018/dep thwise-separable-convolutions-for-machine- learning/[retrieved on Aug. 12, 2019] the whole document.
Jun Li et al: "Sparse Deep Stacking Network for Image Classification" Jan. 5, 2015 (Jan. 5. 2015), XP055611945, Retrieved from the Internet: URL:https://arxiv.org/pdf/1501.00777.pdf Alg.2.
Mark Sandler et al: "Inverted Residuals and Linear Bottlenecks: Mobile Networks for Classification, Detection and Segmentation", Arxiv.Org, Cornell University Library, 201 Olin Library Cornell University Thaca, NY 14853, Jan. 13, 2018 (Jan. 13, 2018), XP080852659, sect.1,3 and 4.
Search Report and Written Opinion dated Aug. 21, 2019 in International Application No. PCT/US2019/030496, filed May 2, 2019, "System and Method for Generating Image Landmarks".
Sun et al.; "Block Mobilenet: Align Large-Pose Faces with <1MB Model Size"; in 2020 15th IEEE International Conference on Automatic Face and Gesture Recognition (FG 2020) (FG), Buenos Aires; Year: 2020, vol. 1, pp. 644-651; (8 pages).
Gholami et al.; "SqueezeNext: Hardware-Aware Neural Network Design"; 2018 IEEE/CVF Conference on Computer Vision and Pattern Recognition Workshops; (10 pages).
Ma et al.; "ShuffleNet V2: Practical Guidelines for Efficient CNN Architecture Design"; arXiv:1807.11164v1 [cs.CV] Jul. 30, 2018 (19 pages).
Zhang et al; "ShuffleNet: An Extremely Efficient Convolutional Neural Network for Mobile Devices" arXiv:1707.01083v2 [cs.CV] Dec. 7, 2017 (9 pages).
Sandler et al.; "MobileNetV2: Inverted Residuals and Linear Bottlenecks"; arXiv:1801.04381v4 [cs.CV] Mar. 21, 2019 (14 pages).
Howard et al.; "MobileNets: Efficient Convolutional Neural Networks for Mobile Vision Applications"; arXiv:1704.04861v1 [cs. CV] Apr. 17, 2017 (9 pages).
Bulat et al.; "How far are we from solving the 2D & 3D Face Alignment problem? (and a dataset of 230,000 3D facial landmarks)"; arXiv:1703.07332v3 [cs.CV] Sep. 7, 2017 (14 pages).
Zhu et al.; "Face Alignment Across Large Poses: A 3D Solution"; arXiv:1511.07212v1 [cs.CV] Nov. 23, 2015; (11 pages).
Howard et al.; "Searching for MobileNetV3"; arXiv:1905.02244v5 [cs.CV] Nov. 20, 2019; (11 pages).
Tan et al.; "MixConv: Mixed Depthwise Convolutional Kernels"; arXiv.org > cs > arXiv: 1907.09595; [Submitted on Jul. 22, 2019 (v1), last revised Dec. 1, 2019 (this version, v3)]; (1 page).
Sun et al.; "LPRNet: Lightweight Deep Network by Low-rank Pointwise Residual Convolution"; arXiv:1910.11853v3 [cs.CV] Nov. 14, 2019 (8 pages).
Notification Concerning Transmittal of International Preliminary report on Patentability in International Application No. PCT/US2019/030496; "System and Method for Generating Image Landmarks"; mailed Nov. 10, 2020.

* cited by examiner

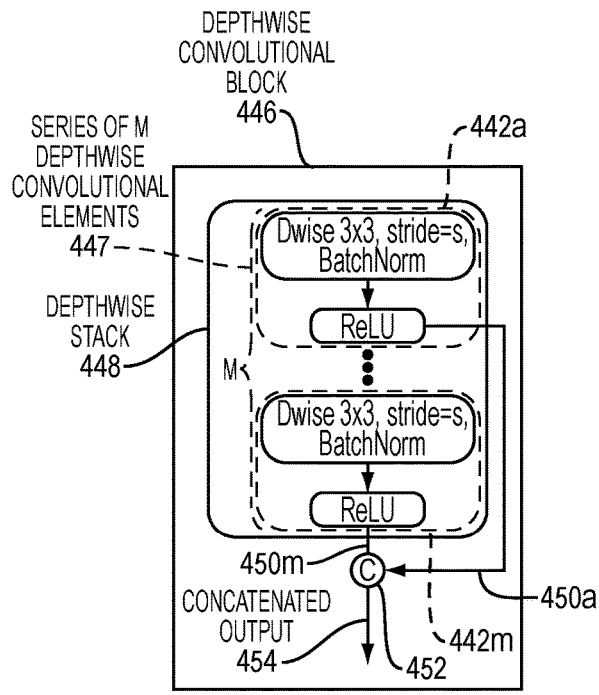
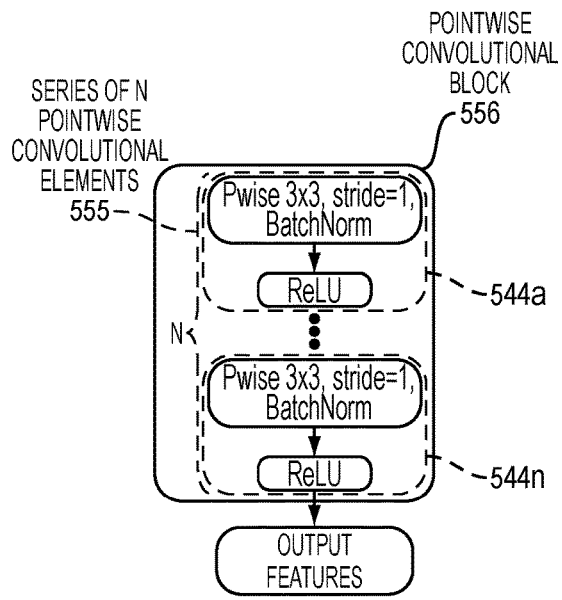
FIG. 4
FIG. 5
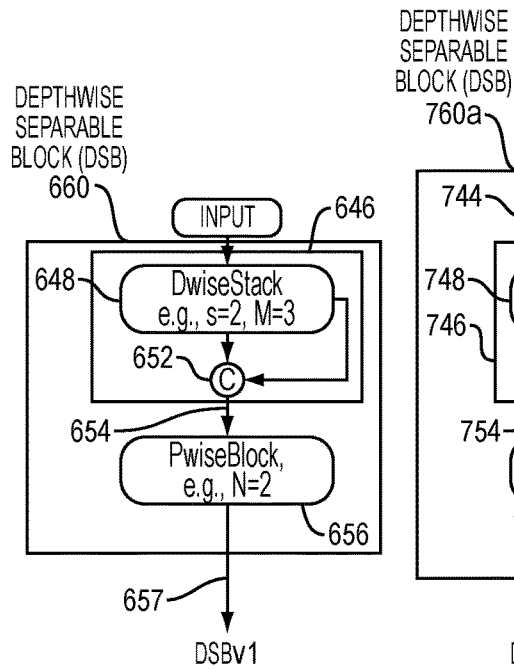
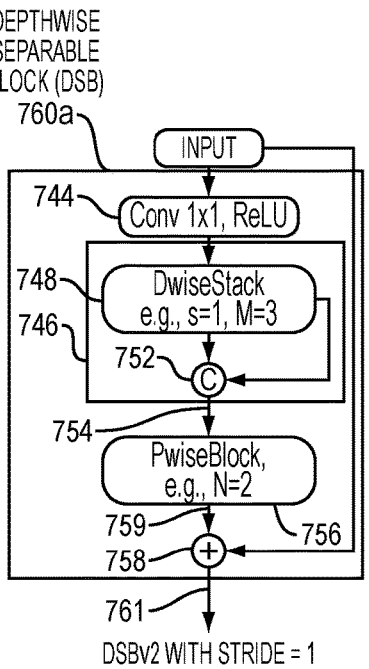
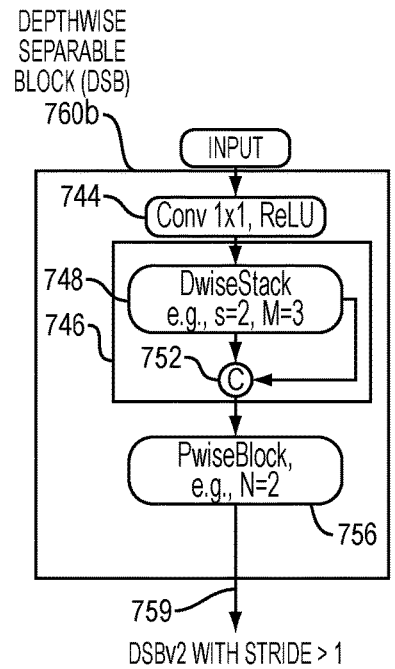
FIG. 6
FIG. 7A
FIG. 7B

| Modules | computational cost (multi-adds) | Parameters (Bytes) |
|---|---|---|
| Traditional | $(\frac{1}{C_{in}} + \frac{1}{S^2_{kernel}}) \times L \times S^2_{kernel} \times S^2_{Feature} \times C_{in} \times C_{out}$ | $(\frac{1}{C_{in}} + \frac{1}{S^2_{kernel}}) \times L \times S^2_{kernel} \times C_{in} \times C_{out}$ |
| Mobilenetv1 | $L \times S^2_{kernel} \times S^2_{Feature} \times C_{in} \times C_{out}$ | $L \times S^2_{kernel} \times C_{in} \times C_{out}$ |
| Block Mobilenetv1 ($\alpha = 1$) | $(\frac{M}{LC_{in}} + \frac{N}{LS^2_{kernel}}) \times L \times S^2_{kernel} \times S^2_{Feature} \times C_{in} \times C_{out}$ | $(\frac{M}{LC_{in}} + \frac{N}{LS^2_{kernel}}) \times L \times S^2_{kernel} \times C_{in} \times C_{out}$ |
| Block Mobilenetv1 ($\alpha < 1$) | $(\frac{\alpha M}{LC_{in}} + \frac{\alpha^2(N+1)}{LS^2_{kernel}}) \times L \times S^2_{kernel} \times S^2_{Feature} \times C_{in} \times C_{out}$ | $(\frac{\alpha M}{LC_{in}} + \frac{\alpha^2(N+1)}{LS^2_{kernel}}) \times L \times S^2_{kernel} \times C_{in} \times C_{out}$ |
| | $S_{Feature} = 14, S_{kernel} = 3, L = 5, \alpha = 0.5, C_{in} = 128, C_{out} = 128, M = 6, N = 4$ | |
| Traditional | 144,506,880 | 2.82M |
| Mobilenetv1 | 17,185,280 | 342.5K |
| Block Mobilenetv1 ($\alpha = 1$) | 14,899,808 | 277.1M |
| Block Mobilenetv1 ($\alpha < 1$) | 4,691,456 | 93.5K |

FIG. 11

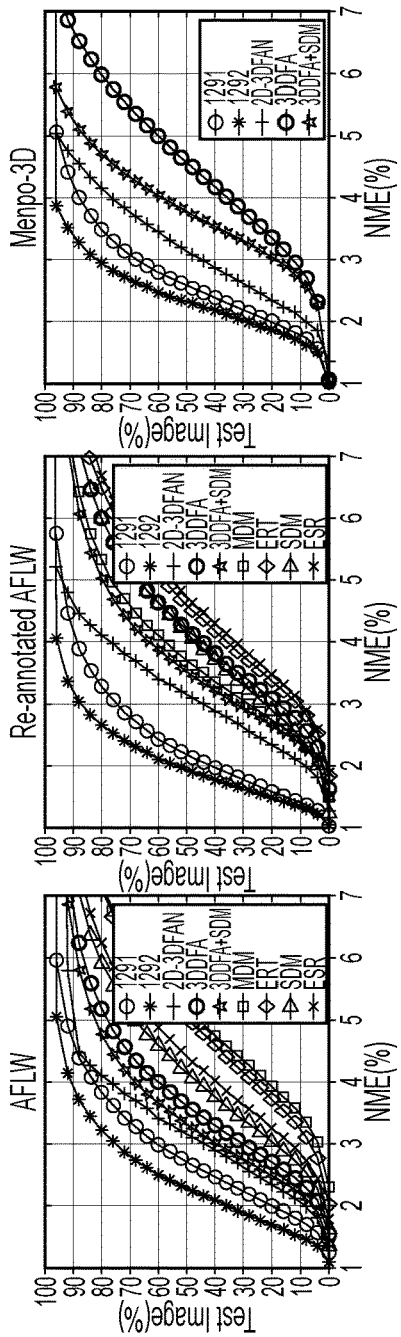
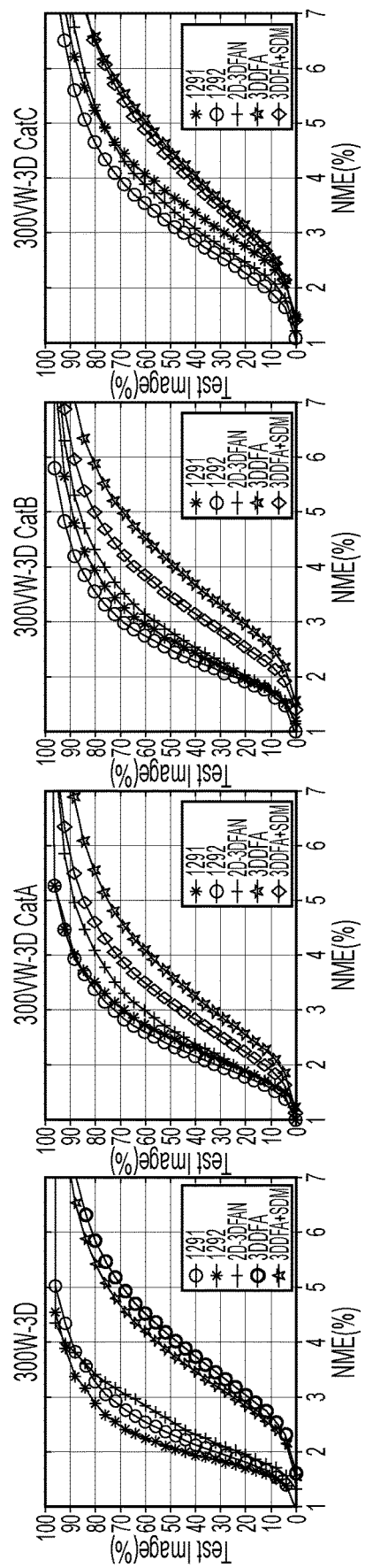

SYSTEM AND METHOD FOR GENERATING IMAGE LANDMARKS

RELATED APPLICATION(S)

This application is the U.S. National Stage of International Application No. PCT/US2019/030496, filed May 2, 2019, which designates the U.S., is published in English, and claims the benefit of U.S. Provisional Application No. 62/666,849, filed on May 4, 2018. The entire teachings of the above applications are incorporated herein by reference.

BACKGROUND

Face alignment is a process of applying a supervised learned model to a digital image of a face and estimating locations of a set of facial landmarks, such as eye corners, mouth corners, etc., of the face. Facial landmarks are certain key points on the face that can be employed for performing a subsequent task focused on the face, such as animation, face recognition, gaze detection, face tracking, expression recognition, and gesture understanding, among others.

SUMMARY

According to an example embodiment, a system for generating three-dimensional (3D) landmarks associated with an object in a two-dimensional (2D) image comprises a detector configured to produce planar coordinates of 3D landmarks at points of the object in the 2D image. The planar coordinates include planar coordinate pairs. The system further comprises a depth coordinate estimator configured to receive the 2D image and the planar coordinates and to estimate a depth coordinate for each planar coordinate pair of each 3D landmark to generate the 3D landmarks.

The object may be a face in the 2D image. The 3D landmarks may be facial landmarks located at strongly and weakly constrained regions of the face. The strongly constrained regions may have fewer changes in a spatial distribution of the facial landmarks relative to the weakly constrained regions.

The system may be configured to apply the 3D landmarks for face alignment, virtual face makeup, face recognition, eye gaze tracking, face synthesis, or other face related application.

The detector may include a feature-generating backbone that includes a neural network element employing a pairing of a depthwise convolutional block and pointwise convolutional block. The pointwise convolutional block may be configured to receive features output by the depthwise convolutional block and output feature-generating-backbone output features.

In one embodiment, the depthwise convolutional block includes a depthwise stack including depthwise convolutional elements arranged in series and a concatenator. Each depthwise convolutional element in the series is configured to output respective features as a function of respective input. In this embodiment, the concatenator includes inputs coupled to outputs of each of the depthwise convolutional elements of the depthwise stack to receive each of the respective features output and is configured to produce a concatenated output with each of the respective features. The depthwise convolutional block is a special neural network structure that is employed in multiple example embodiments disclosed herein.

The series may include at least three depthwise convolutional elements. The inputs of the concatenator are coupled to outputs of each of the at least three depthwise convolutional elements of the depthwise convolutional block in this example embodiment.

The depthwise convolutional elements may include a respective depthwise convolutional layer. The respective depthwise convolutional layer may include batch normalization and a rectified linear unit (ReLU) activation function.

The pointwise convolutional block may include pointwise convolutional elements arranged in series. Each pointwise convolutional element in the series may be configured to output respective features as a function of respective input.

The pointwise convolutional elements may include a respective pointwise convolutional layer. The respective pointwise convolutional layer may include batch normalization and a ReLU activation function.

The neural network element may be further configured to employ a pointwise convolutional layer. The depthwise convolutional block may be configured to receive features from the pointwise convolutional layer and output the feature-generating-backbone output features.

The pointwise convolutional layer may include batch normalization and a ReLU activation function. It should be understood that, in general, pointwise convolutional layers disclosed herein may include batch normalization and a ReLU activation function.

The neural network element may be further configured to employ a pointwise convolutional layer and an add operator. The depthwise convolutional block may be configured to receive features from the pointwise convolutional layer. The add operator may be configured to receive all input to the pointwise convolutional layer and features output from the pointwise convolutional block and to output the feature-generating-backbone output features, wherein a stride value of the depthwise convolutional block is one.

The detector may further include a first regressor, second regressor, concatenator, an output pointwise convolutional layer and a pooling layer. The first and second regressors may be predictors that predict values that are close to a ground truth. In one example embodiment, the first regressor is configured to receive features output by the feature-generating backbone. The first regressor may include at least one first sequential pairing of a pointwise convolutional layer and a depthwise convolutional layer for a first respective dimension of a coordinate system. The second regressor may be configured to receive the features output by the feature-generating backbone. The second regressor may include at least one second sequential pairing of a pointwise convolutional layer and a depthwise convolutional layer for a second respective dimension of the coordinate system. The second regressor may have fewer channels of outputs (e.g., a fewer number of output features) than the first regressor. The at least one second sequential pairing may be equal in number as the at least one first sequential pairing. In this example embodiment, the concatenator is configured to concatenate features output from each depthwise convolutional layer of the first and second regressors and to output concatenated features. The output pointwise convolutional layer and pooling layer are configured to receive the concatenated features output from the concatenator and produce the planar coordinates for the 3D landmarks.

The depth coordinate estimator may include alternating layers of pointwise and depthwise convolutional layers and a pooling layer. In one example embodiment, the depthwise convolutional layers each downsample received features. An input to the alternating layers may include feature maps of red-green-blue (RGB) pixel information of the 2D image and corresponding planar coordinates. In this example embodiment, the pooling layer is configured to receive features of weighted pixels associated with the landmarks and output a depth coordinate associated with each landmark.

According to another example embodiment, a method for generating 3D landmarks associated with an object in a 2D image comprises producing planar coordinates of landmarks at points of the object in the 2D image, the planar coordinates including planar coordinate pairs. The method further comprises estimating a depth coordinate for each planar coordinate pair of each landmark based on the 2D image and the planar coordinates to generate the 3D landmarks.

The object may be a face in the 2D image, and, for such an object the 3D landmarks are facial landmarks located at strongly and weakly constrained regions of the face. The strongly constrained regions may have fewer changes in a spatial distribution of the facial landmarks relative to the weakly constrained regions.

The method may further comprise applying the 3D landmarks for face alignment, virtual face makeup, face recognition, eye gaze tracking, face synthesis, or other face related application.

Producing the planar coordinates of the 3D landmarks may include employing a pairing of a depthwise convolutional block and pointwise convolutional block, the pointwise convolutional block receiving features output by the depthwise convolutional block and outputting feature-generating-backbone features.

Producing the planar coordinates of the 3D landmarks may include performing depthwise convolution in series, each depthwise convolution in the series outputting respective features as a function of respective input, concatenating respective features output from each of the depthwise convolutions of the series, and outputting the feature-generating-backbone output features.

The series may include at least three depthwise convolutions, in which case the producing includes concatenating respective features output from each of the at least three depthwise convolutions.

The depthwise convolutions perform depthwise convolution at depthwise convolutional respective layers. Producing the planar coordinates of the 3D landmarks includes employing batch normalization and a rectified linear unit (ReLU) activation function at the respective depthwise convolutional layer in some embodiments.

The pointwise convolutional block performs pointwise convolutions in series. Producing the planar coordinates of the 3D landmarks in this example embodiment includes outputting respective features as a function of respective input at each pointwise convolution in the series.

The pointwise convolutions may include performing pointwise convolution at respective layers. The producing may further include employing batch normalization and a ReLU activation function at the respective layers.

Producing the planar coordinates of the 3D landmarks may further include employing a pointwise convolutional layer, the depthwise convolutional block receiving features from the pointwise convolutional layer and outputting the feature-generating-backbone output features.

Producing the planar coordinates of the 3D landmarks further includes employing batch normalization and a ReLU activation function at the pointwise convolutional layer in some embodiments.

Producing the planar coordinates of the 3D landmarks may further include employing a pointwise convolutional layer, the depthwise convolutional block receiving features from the pointwise convolutional layer. The producing in this example embodiment includes adding all input to the pointwise convolutional layer to features output from the pointwise convolutional block and outputting the feature-generating-backbone output features, wherein a stride value of the depthwise convolutional block is one.

The method may further comprise outputting the feature-generating-backbone features from the pointwise convolutional block to a first regressor, the first regressor including at least one first sequential pairing of a pointwise convolutional layer and a depthwise convolutional layer for a first respective dimension of a coordinate system. The method further comprises outputting the feature-generating-backbone features from the pointwise convolutional block to a second regressor, the second regressor including at least one second sequential pairing of a pointwise convolutional layer and a depthwise convolutional layer for a second respective dimension of the coordinate system, the second regressor having fewer channels of outputs than the first regressor, the at least one second sequential pairing being equal in number as the at least one first sequential pairing. The method further comprises concatenating features output from each depthwise convolutional layer of the first and second regressors to produce concatenated features, inputting the concatenated features to an output pointwise convolutional layer, and outputting the planar coordinates of the 3D landmarks.

The estimating may include inputting feature maps of RGB pixel information of the 2D image and the planar coordinates to alternating layers of pointwise and depthwise convolutional layers, the depthwise convolutional layers each downsampling received features; and combining features of weighted pixels associated with the landmarks and outputting a depth coordinate associated with each landmark.

According to another example embodiment, a non-transitory computer-readable medium may generate 3D landmarks associated with an object in a 2D image. The non-transitory computer-readable medium may have encoded thereon a sequence of instructions which, when loaded and executed by at least one processor, causes the at least one processor to produce planar coordinates of landmarks at points of the object in the 2D image, the planar coordinates including planar coordinate pairs. The sequence of instructions which, when loaded and executed by the at least one processor, may further cause the at least one processor to estimate a depth coordinate for each planar coordinate pair of each landmark based on the 2D image and the planar coordinates to generate the 3D landmarks.

According to another example embodiment, a neural network element may comprise a depthwise stack including depthwise convolutional elements arranged in series, each depthwise convolutional element in the series configured to output respective features as a function of respective input. This example embodiment further includes a concatenator having inputs coupled to outputs of each of the depthwise convolutional elements of the depthwise stack to receive each of the respective features output and configured to produce a concatenated output with each of the respective features.

The series of depthwise convolutional elements includes at least three depthwise convolutional elements in one embodiment and the inputs of the concatenator are coupled to outputs of each of the at least three depthwise convolutional elements.

The depthwise convolutional elements include a respective depthwise convolutional layer, wherein the respective depthwise convolutional layer may include batch normalization and a rectified linear unit (ReLU) activation function.

According to another example embodiment, a neural network element comprises a depthwise convolutional block and a pointwise convolutional block configured to receive features output by the depthwise convolutional block.

According to another example embodiment, a neural network element comprises a pointwise convolutional layer, a depthwise convolutional block configured to receive features from the pointwise convolutional layer, and a pointwise convolutional block configured to receive features output from the depthwise convolutional block.

In this example embodiment, the neural network element further comprises an add operator configured to receive all input to the pointwise convolutional layer and features output from the pointwise convolutional block. A stride value of the depthwise convolutional block may be one, and the pointwise convolutional layer may include batch normalization and a rectified linear unit (ReLU) activation function.

According to another example embodiment, a neural network may include a feature-generating backbone including a neural network element employing a pairing of a depthwise convolutional block and pointwise convolutional block. The neural network of this example embodiment includes a first regressor configured to receive features output by the feature-generating backbone, the first regressor including at least one first sequential pairing of a pointwise convolutional layer and a depthwise convolutional layer for a first respective dimension of a coordinate system. The neural network of this example embodiment also includes a second regressor configured to receive the features output by the feature-generating backbone. The second regressor includes at least one second sequential pairing of a pointwise convolutional layer and a depthwise convolutional layer for a second respective dimension of the coordinate system. The second regressor has fewer channels of outputs than the first regressor. The at least one second sequential pairing may be equal in number as the at least one first sequential pairing. The neural network of this example embodiment includes a concatenator configured to concatenate features by concatenating features output from each depthwise convolutional layer of the first and second regressors. The concatenator outputs concatenated features. The neural network of this example embodiment further includes an output pointwise convolutional layer and pooling layer configured to receive the concatenated features output from the concatenator. The output pointwise convolutional layer and pooling layer produces planar coordinates for landmarks associated with input to the feature-generating backbone.

The neural network element of this example embodiment further employs an input pointwise convolutional layer. The depthwise convolutional block is configured to receive features from the input pointwise convolutional layer. The pointwise convolutional block is configured to receive features output from the depthwise convolutional block and to output feature-generating-backbone output features. The first and second regressors are configured to receive the feature-generating-backbone output features.

The neural network element of this example embodiment employs an input pointwise convolutional layer and an add operator. The depthwise convolutional block is configured to receive features from the input pointwise convolutional layer. The pointwise convolutional block is configured to receive features output from the depthwise convolutional block. The add operator is configured to receive all input to the input pointwise convolutional layer and features output from the pointwise convolutional block and to output feature-generating-backbone output features. A stride value of the depthwise convolutional block may be one. The first and second regressors may be configured to receive the feature-generating-backbone output features.

According to another example embodiment, an augmented reality system comprises parallel regressors configured to produce 3D landmarks at points of highly and weakly constrained regions of a face in a 2D image and a processor configured to apply the 3D landmarks to produce an augmented reality effect in relation to the face.

The augmented reality effect may be a synthesized image of the face.

The augmented reality effect may be virtual makeup applied to the face.

According to another example embodiment, a neural network comprises alternating layers of pointwise and depthwise convolutional layers. In this example embodiment, the depthwise convolutional layers each downsample received features. An input to the alternating layers includes feature maps of RGB pixel information of a 2D image and landmarks associated with the 2D image. The neural network of this example embodiment comprises a pooling layer configured to receive features of weighted pixels associated with the landmarks and to output a depth coordinate associated with each landmark.

It should be understood that example embodiments disclosed herein can be implemented in the form of a method, apparatus, system, or computer readable medium with program codes embodied thereon.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 4 is a block diagram of an example embodiment of a depthwise convolutional block.

FIG. 5 is a block diagram of an example embodiment of a pointwise convolutional block.

FIG. 6 is a block diagram of an example embodiment of a depthwise separable block (DSB).

FIG. 7A is a block diagram of another example embodiment of a DSB.

FIG. 7B is a block diagram of yet another example embodiment of a DSB.

FIG. 11 is a table of comparison results on time and space complexity between existing systems and example embodiments of the present invention.

FIGS. 12A-G are graphs that include cumulative errors distribution (CED) curves on different test datasets.

DETAILED DESCRIPTION

A description of example embodiments follows.

Three-dimensional (3D) face alignment methods based on deep models (i.e., deep neural networks) have become very popular due to their empirical success. High time and space complexities, however, make it difficult to apply such a model to mobile devices and embedded devices. To decrease computation and memory costs of such a model, a neural network is used that has at least one of multiple distinguishing features compared to existing neural networks, from a building block element through a high-level architecture. For example, a mid-level architecture of an example neural network disclosed herein is a depthwise separable block (DSB) that includes a low-level element of a depthwise convolutional block, also referred to interchangeably herein as a depthwise block, and a pointwise convolutional block, also referred to interchangeably herein as a pointwise block.

Figure 8:
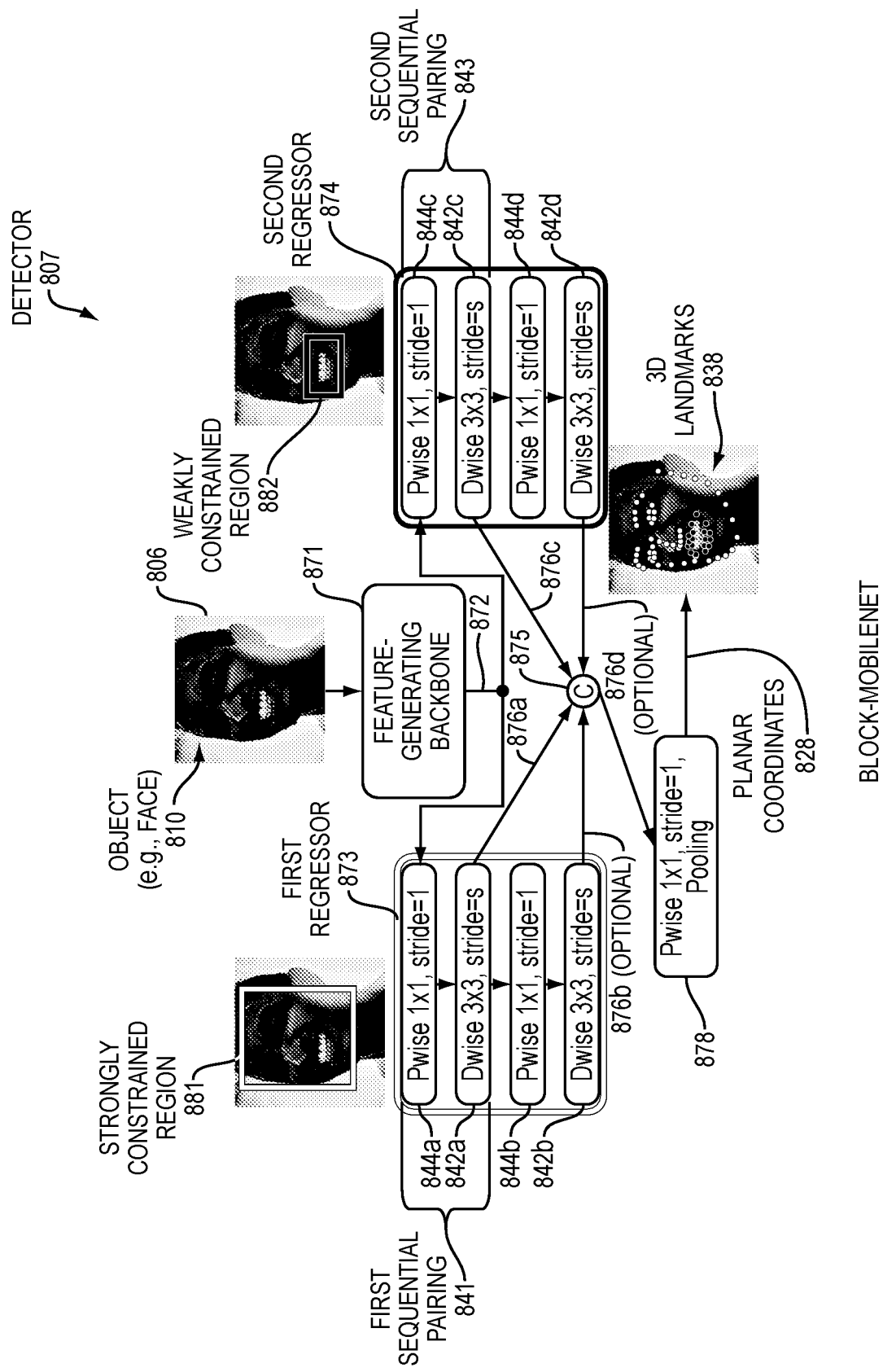
FIG. 8 is a block diagram of an example embodiment of a detector.

An example embodiment of the depthwise block is constructed by stacking depthwise convolutional layers and employing a concatenation operation, whereas an example embodiment of the pointwise block includes pointwise convolutional layers stacked together in a traditional manner. An example embodiment (referred to interchangeably herein as Block Mobilenet, Block-Mobilenet, B-Mobilenet, and light-weight Block-Mobilenet), described in further detail below with regard to FIG. 8, is disclosed that employs an example embodiment of a DSB, disclosed in further detail below in reference to FIGS. 6, 7A, and 7B. It is worth noting that an example embodiment of Block-Mobilenet successfully reduces network parameters from megabytes (MB) to kilobytes (KB), as disclosed further below. As disclosed further below, experiments on four popular datasets verify that an example embodiment of Block-Mobilenet has better overall performance (e.g., mean normalized mean error (NME) on 68 points: 3:81%; speed on CPU: 91 FPS; storage size: 876 KB) than the state-of-the-art methods. The foregoing and other example embodiments are described in further detail below in reference to the accompanying figures.

Figure 1A:
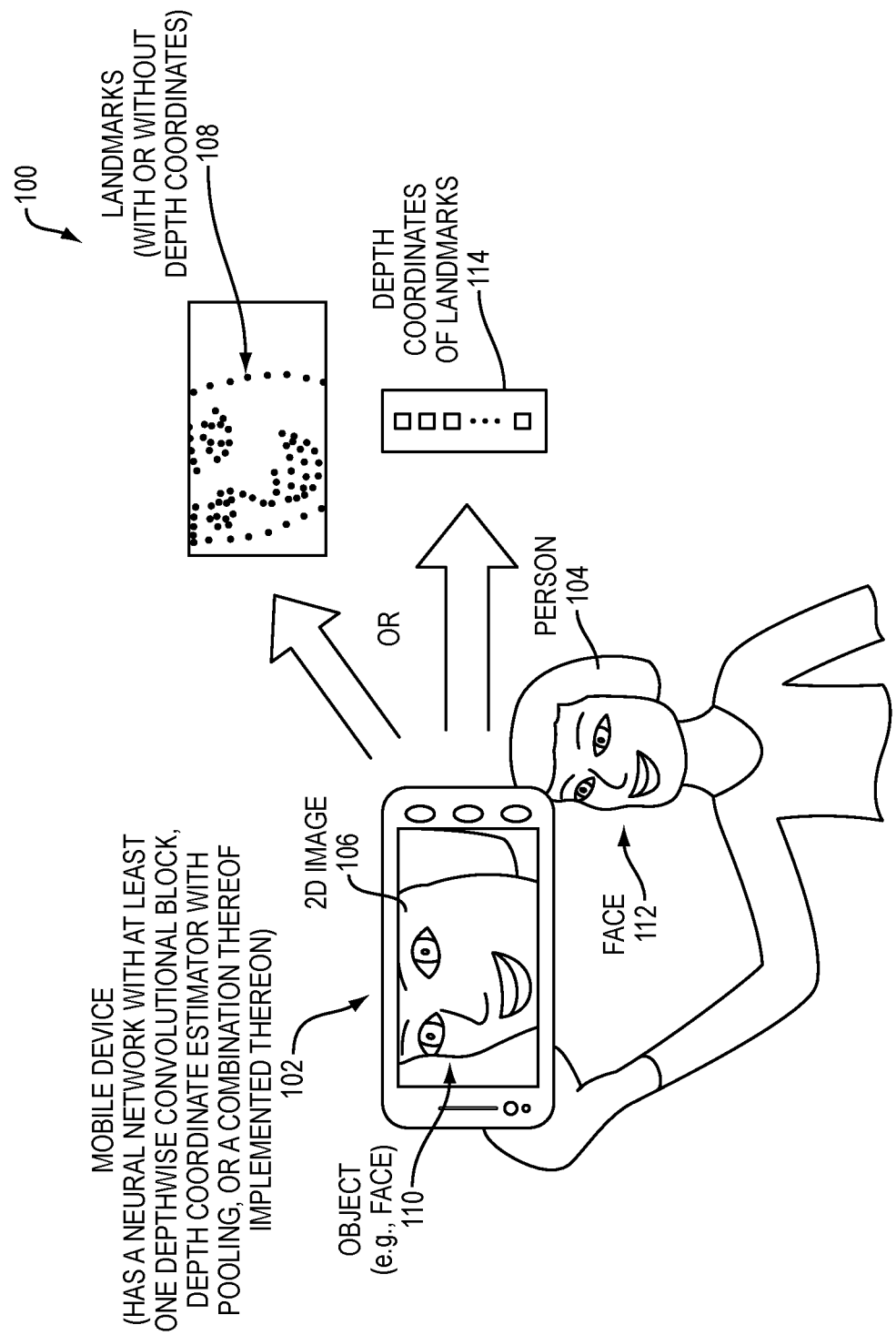
FIG. 1A is a block diagram of an example embodiment of a mobile device with an example embodiment of a neural network implemented thereon and a person using the mobile device.

FIG. 1A is a block diagram 100 of an example embodiment of a mobile device 102 with an example embodiment of a neural network (not shown) implemented thereon and a person 104 using the mobile device 102. The neural network has at least one depthwise convolutional block (not shown), depth coordinate estimator (not shown) with pooling, or a combination thereof. Example embodiments of the at least one depthwise convolutional block and depth coordinate estimator with pooling are disclosed further below with regard to FIG. 4 and FIG. 9, respectively. According to an example embodiment, the neural network is not a fully connected network.

Continuing to refer to FIG. 1A, the person 104 is using the mobile device 104 to capture a 2D image 106. In the example embodiment, the 2D image 106 is a "selfie," that is, an image that includes the person 102 and is taken by the person 102; however, it should be understood that 2D images disclosed herein are not limited to selfie images and may be any suitable image that includes a target object for which the mobile device 104 or other computational system has a neural network trained according to a given model. Further, it should be understood that 2D images disclosed herein may be captured via any suitable electronic device and are not limited to being captured by a mobile device. Moreover, in the example embodiment, the mobile device 104 is a smartphone with a camera; however, it should be understood that mobile devices disclosed herein are not limited to smartphones and may be any suitable handheld computer. Also, it should be understood that example embodiments disclosed herein are not limited mobile or embedded devices. For example, the neural network in the example embodiment may be implemented on a remote server or other computational system.

In the example embodiment of FIG. 1A, the neural network with the at least one depthwise convolutional block may generate landmarks 108 of an object 110 in the 2D image 106. In the example embodiment, the object 110 is a face, namely, a digital representation of a face 112 of the person 104 in the 2D image 106, however, it should be understood that the object 110 may be any type of object in a digital image. The landmarks 108 may be generated with or without the depth coordinates 114. As such, the landmarks 108 generated by the neural network may be 2D landmarks or 3D landmarks.

For example, in an event the neural network does not have the depth coordinator with pooling according to an example embodiment, the neural network may generate the landmarks 108 as 2D landmarks, that is, landmarks with respective planar (i.e., x-y) coordinates and no respective depth (i.e., z) coordinate. In an event, however, that the neural network has, in combination, the at least one depthwise convolutional block and the depth coordinator with pooling, the neural network may generate the landmarks 108 as 3D landmarks, that is, landmarks having both the respective planar (i.e., x-y) coordinate pair and the respective depth (i.e., z) coordinate.

Alternatively, the neural network may not have the at least one depthwise convolutional block; however, the neural network may have the depth coordinate estimator with pooling. In such an example embodiment, the neural network may be configured to receive the 2D image (e.g., RGB feature maps thereof) and landmarks associated with the 2D image, and may employ the depth coordinate estimator with pooling to output a depth coordinate associated with each landmark, that is, the depth coordinates 114, such as disclosed further below with regard to FIG. 9.

The neural network has parameters reduced from MB to KB and has better performance relative to state-of-the-art methods, as disclosed in detail further below. Decreasing the parameters from MB to KB decreases computation and memory costs thereby enabling the neural network to be applied on the mobile device 102. As such, the neural network may be configured to apply the 3D landmarks for face alignment, virtual face makeup, face recognition, eye gaze tracking, face synthesis, or other face related application on the mobile device 102.

Figure 1B:
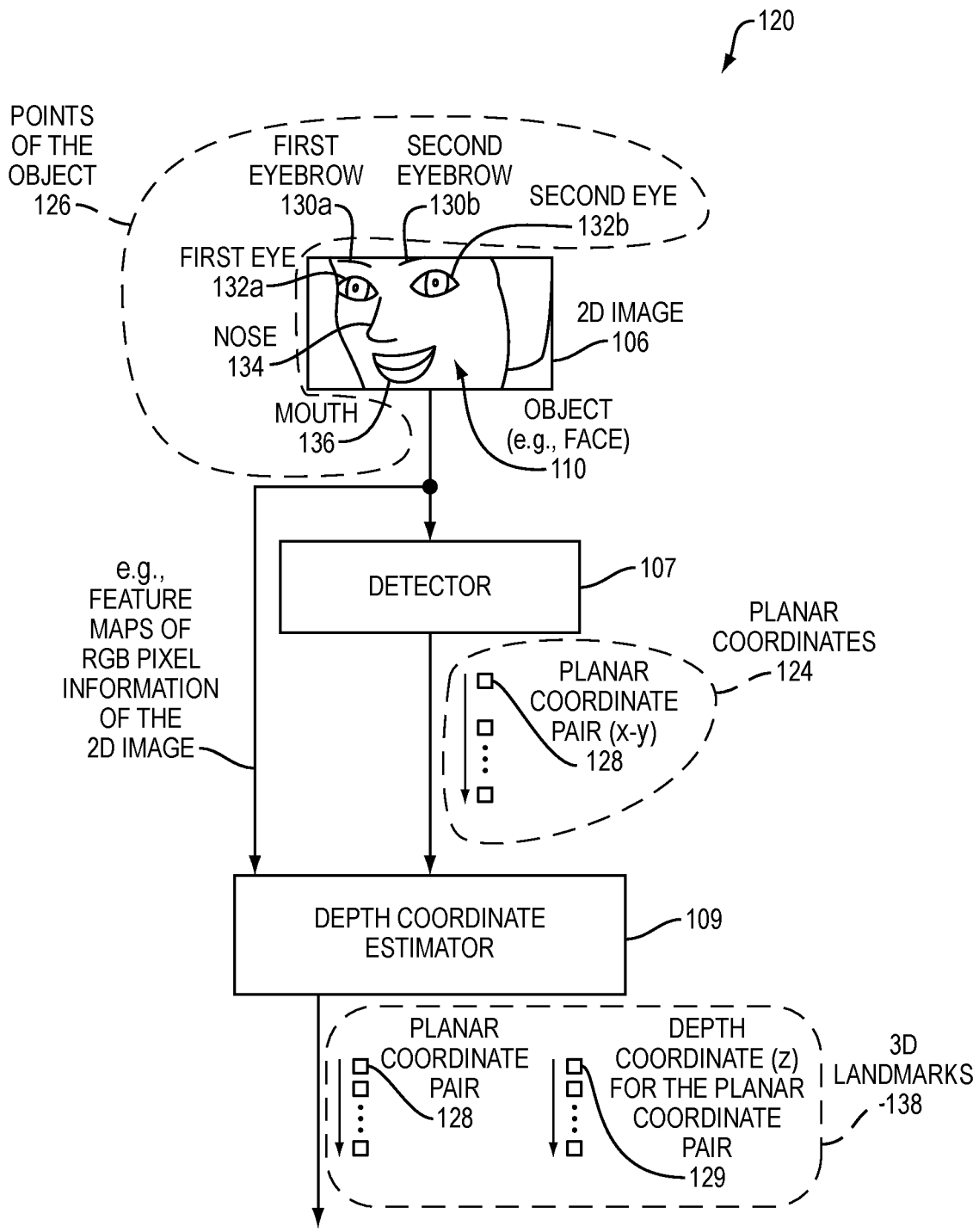
FIG. 1B is block diagram of an example embodiment of a system for generating 3D landmarks associated with an object in a 2D image.

FIG. 1B is block diagram of an example embodiment of a system 120 for generating 3D landmarks, such as the landmarks 108 associated with the object 110 in the 2D image 106 of FIG. 1A, disclosed above. The system 120 includes a neural network. The neural network may not be a fully-connected neural network. The 3D landmarks have x-y-z coordinates. The system 120 comprises a detector 107 configured to produce planar coordinates 124 of the landmarks 108 at points 126 of the object 110 in the 2D image 106. The planar coordinates 124 include planar coordinate pairs, such as the planar coordinate pair 128. The system 120 further includes a depth coordinate estimator 109 configured to receive the 2D image 106 and the planar coordinates 124 and to estimate a depth coordinate 129 for each planar coordinate pair of each landmark to generate the 3D landmarks 138. The depth coordinate (i.e., z coordinate) may be used to determine whether a respective landmark is self-occluding.

In the example embodiment of FIG. 1B, the object 110 is a face in the 2D image 106 and the points 126 are points of a first eyebrow 130a, second eyebrow 130b, first eye 132a, second eye 132b, nose 134, and mouth 136 of the person 104 that are captured in the 2D image 106. As such, the 3D landmarks 108 are facial landmarks. It should be understood that the points 126 may be any suitable points of the object 110. The points 126 may located at strongly and weakly constrained regions of the face, such as disclosed further below with regard to FIG. 8. The strongly constrained regions may have fewer changes in a spatial distribution of the facial landmarks relative to the weakly constrained regions. The system 120 may be configured to apply the 3D landmarks 108 for face alignment, virtual face makeup, face recognition, eye gaze tracking, face synthesis, or other face related application.

According to an example embodiment, the detector 107 and the depth coordinate estimator 109 may each include at least one depthwise convolutional element and at least one pointwise convolutional element, such as disclosed below with regard to FIG. 2 and FIG. 3, respectively.

Figure 2:
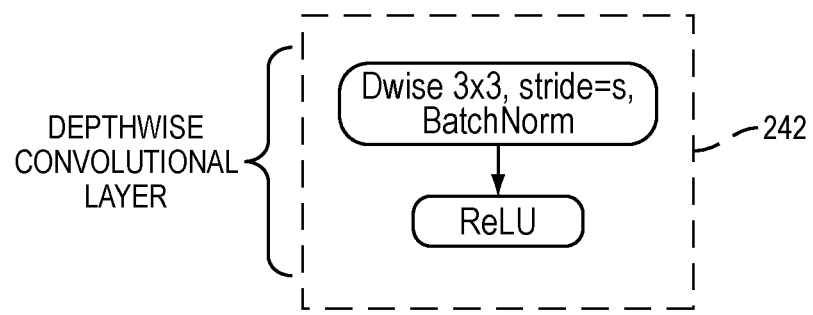
FIG. 2 is a block diagram of an example embodiment of a prior art depthwise convolutional element.

FIG. 2 is a block diagram of an example embodiment of a prior art depthwise convolutional element 242. The depthwise convolutional element 242 may be a depthwise convolutional layer and may be configured to apply a single convolutional filter (not shown) to each input channel (not shown). The depthwise convolutional layer convolves feature maps on a single channel. In the depthwise convolutional layer, only one kernel is convolved per feature map. In the example embodiment, the depthwise convolutional element 242 has a kernel size of 3, that is, 3×3; however, it should be understood that the kernel size is not limited to 3 and may be any suitable kernel size. The depthwise convolutional element 242 may employ batch normalization, also referred to interchangeably herein as BatchNorm, and a rectified linear unit (ReLU) activation function. Batch normalization may normalize features in batches based on an amount of memory available and normalize the features of each batch to enable a model (e.g., neural network) employing the depthwise convolutional element 242 to converge easier. The ReLU activation function may be any suitable ReLU activation function. Batch normalization and ReLU may be employed to enhance the ability of anti-overfitting. It should be understood that employing BatchNorm, ReLU, or a combination thereof is optional. The depthwise convolutional element 242 has a stride value of s. The stride value s may be any suitable value used to control a step for moving the kernel. Depthwise convolution is disclosed in further detail, further below.

Figure 3:
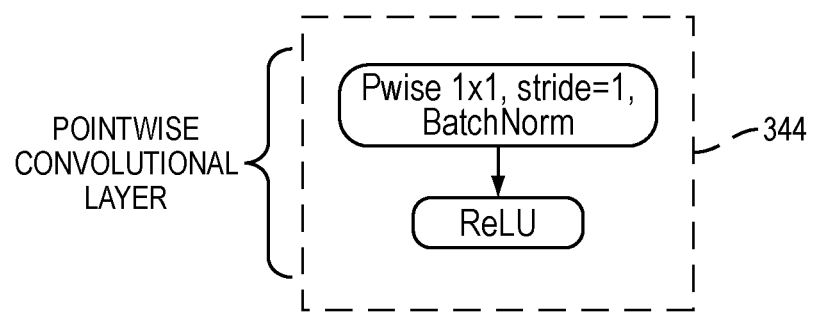
FIG. 3 is a block diagram of an example embodiment of a prior art pointwise convolutional element.

FIG. 3 is a block diagram of an example embodiment of a prior art pointwise convolutional element 344. The pointwise convolutional element 344 may be a pointwise convolutional layer. In the example embodiment, the pointwise convolutional element 344 has a kernel size of 1, that is, 1×1. The pointwise convolutional element 344 may be configured to use 1×1 convolution to build new features (not shown) by computing linear combinations of all input channels (not shown). Pointwise convolution combines features from different channels to create new features and thus, more channels. Pointwise convolution is disclosed in further detail, further below.

Referring back to FIG. 1B, the detector 107 may employ a depthwise convolutional block (not shown). An example embodiment of the depthwise convolutional block is disclosed below with regard to FIG. 4.

FIG. 4 is a block diagram of an example embodiment of a depthwise convolutional block 446. The depthwise convolutional block 446 is a neural network element and may be referred to interchangeably herein as a "Depthwise Block." The depthwise convolutional block 446 (i.e., Depthwise Block) includes a depthwise stack 448. The depthwise stack 448 includes M depthwise convolutional elements, such M number of the depthwise convolutional element 242, disclosed above with regard to FIG. 2. The M depthwise convolutional elements are arranged in series, namely a first depthwise convolutional element 442a through a last convolutional element 442m. Each depthwise convolutional element in the series 447 is configured to output respective features as a function of respective input. The depthwise convolutional block 446 includes a concatenator 452 that has inputs coupled to outputs of each of the depthwise convolutional elements of the depthwise stack 448 to receive each of the respective features output, such as the first features 450a and last features 450m output by the first depthwise convolutional element 442a and last depthwise convolutional element 442m, respectively. The concatenator 452 is configured to produce a concatenated output 454 with each of the respective features output.

According to an example embodiment, the series 447 may include at least three depthwise convolutional elements. For example, M may be at least 3. The inputs of the concatenator 452 may be coupled to outputs of each of the at least three depthwise convolutional elements.

The depthwise convolutional elements 442a-m may each include a respective depthwise convolutional layer. The respective depthwise convolutional layer may include batch normalization and a rectified linear unit (ReLU) activation function, as disclosed above with regard to FIG. 2.

Referring back to FIG. 1B, the detector 107 may employ a pointwise convolutional block (not shown). An example embodiment of the pointwise convolutional block is disclosed below with regard to FIG. 5.

FIG. 5 is a block diagram of an example embodiment of a pointwise convolutional block 556. The pointwise convolutional block 556 may be referred to interchangeably herein as a "Pointwise Block." The pointwise convolutional block 556 (i.e., Pointwise Block) includes N pointwise convolutional elements, such as disclosed above with regard to FIG. 3, arranged in series, namely a first pointwise convolutional element 544a through a last pointwise convolutional element 544n. Each pointwise convolutional element in the series 555 may be configured to output respective features as a function of respective input.

According to an example embodiment, the series 555 may include at least two pointwise convolutional elements. For example, N may be at least 2.

The pointwise convolutional elements 544a-n may each include a respective pointwise convolutional layer. According to an example embodiment, the respective pointwise convolutional layer may include batch normalization and a ReLU activation function, as disclosed above with regard to FIG. 3.

Referring back to FIG. 1B, the detector 107 may employ a pairing of a depthwise convolutional block and pointwise convolutional block (not shown). The pairing may be referred to as a depthwise separable block (DSB). Example embodiments of the DSB are disclosed below with regard to FIG. 6, FIG. 7A, and FIG. 7B.

FIG. 6 is a block diagram of an example embodiment of a DSB 660. The DSB 660 may also be referred to interchangeably herein as DSBv1, and is disclosed in further detail further below. The DSB 660 includes a pairing of a depthwise convolutional block 646 and pointwise convolutional block 556, such as disclosed above with regard to FIG. 4 and FIG. 5, respectively.

For example, the depthwise convolutional block 646 includes a depthwise stack 648. The depthwise stack 648 includes M depthwise convolutional elements, such as disclosed above with regard to FIG. 2, arranged in series, such as disclosed above with regard to FIG. 4. The depthwise convolutional block 646 includes a concatenator 652 that has inputs coupled to outputs of each of the depthwise convolutional elements of the depthwise stack 648 to receive each of the respective features output. The concatenator 652 is configured to produce a concatenated output 654 with each of the respective features. The pointwise convolutional block 656 includes N pointwise convolutional elements, such as disclosed above with regard to FIG. 3. Each pointwise convolutional element in the series may be configured to output respective features as a function of respective input, such as disclosed above with regard to FIG. 5. According to an example embodiment, a number M of the depthwise convolutional elements in the depthwise stack 648 of the depthwise convolutional block 646 is greater than a number N of pointwise convolutional elements in the pointwise convolutional block 656. According to an example embodiment, M is 3 and N is 2.

The pointwise convolutional block 656 may be configured to receive features output by the depthwise convolutional block 646, namely the concatenated output 654, and output features 657, that may be feature-generating-backbone output features that may be output from a feature-generating backbone, as disclosed further below with regard to FIG. 8.

FIG. 7A is a block diagram of another example embodiment of a DSB 760a. The DSB 760a may also be referred to interchangeably herein as DSBv2, and is disclosed in further detail further below. Similar to the DSB 660, disclosed above with regard to FIG. 6, the DSB 760a includes a pairing of a depthwise convolutional block 746 and pointwise convolutional block 756, such as disclosed above with regard to FIG. 4 and FIG. 5, respectively; however, the DSB 760a further employs a pointwise convolutional layer 744, such as disclosed above with regard to FIG. 3, and an add operator 758.

The depthwise convolutional block 746 is configured to receive features from the pointwise convolutional layer 744. The depthwise convolutional block 746 includes a depthwise stack 748. The depthwise stack 748 includes M depthwise convolutional elements, such as disclosed above with regard to FIG. 2, arranged in series, such as disclosed above with regard to FIG. 4. The depthwise convolutional block 746 includes a concatenator 752 that has inputs coupled to outputs of each of the depthwise convolutional elements of the depthwise stack 748 to receive each of the respective features output. The concatenator 752 is configured to produce a concatenated output 754 with each of the respective features. The pointwise convolutional block 756 includes N pointwise convolutional elements, such as disclosed above with regard to FIG. 3. Each pointwise convolutional element in the series may be configured to output respective features as a function of respective input, such as disclosed above, with regard to FIG. 5.

The pointwise convolutional block 756 is configured to receive features output by the depthwise convolutional block 746, namely the concatenated output 754, and outputs features 759 to the add operator 758. The add operator 758 is configured to receive all input to the pointwise convolutional layer 744 and the output features 759 output from the pointwise convolutional block 756 and outputs the output features 761 that may be feature-generating-backbone output features that are output from a feature-generating backbone, as disclosed further below with regard to FIG. 8. In the example embodiment of FIG. 7A, a stride value s of the depthwise convolutional block 746 is one. More specifically, each depthwise convolutional element in the series of the depthwise stack 746 has a stride value s equal to one. Alternatively, the stride value s of the depthwise convolutional block 746 may be greater than one, in which case the add operator 758 may not be employed, such as disclosed in FIG. 7B.

FIG. 7B is a block diagram of yet another example embodiment of a DSB 760b. The DSB 760b, also referred to interchangeably herein as DSBv2, has all of the elements of the DSB 760a of FIG. 7A, disclosed above; however, the DSB 760b has a stride value s that is greater than one and, therefore, does not employ the add operator 758 of the DSB 760a of FIG. 7A. As such, the pointwise convolutional block 756 of the DSB 760b outputs the output features 759 that may be output from a feature-generating backbone, as disclosed further below with regard to FIG. 8.

FIG. 8 is a block diagram of an example embodiment of a detector 807. The detector 807 may be employed as the detector 107 of FIG. 1B, disclosed above. The detector 807 is configured to produce planar coordinates 828 of 3D landmarks 838 at points of the object 810 in the 2D image 806.

In the example embodiment of FIG. 8, the object 810 is a face. The 3D landmarks 838 may be facial landmarks located at strongly and weakly constrained regions of the face, such as the strongly constrained region 881 and weakly constrained region 882. The strongly constrained region 881 may have fewer changes in a spatial distribution of the facial landmarks relative to the weakly constrained region 882. The strongly constrained region 881 includes a contour of the face, eye brows, nose, and eyes of the face, that may have small changes in the spatial distribution of the landmarks as compared with the weakly constrained region 882 that includes a mouth region of the face.

The detector 807 includes a feature-generating backbone 871 including a neural network element (not shown). The neural network element may employ a pairing of a depthwise convolutional block and pointwise convolutional block, such as disclosed above with regard to FIG. 6 (i.e., DSBv1), FIG. 7A (i.e., DSBv2 with stride of 1), and FIG. 7B (i.e., DSBv2 with stride greater than one). As such, the feature-generating backbone 871 may be referred to interchangeably herein as a DSB Backbone. The detector 807 may be referred to interchangeably herein as Block Mobilenet, Block-Mobilenet, or simply, B-Mobilenet. An example embodiment of the detector 807 that employs DSBv1 as the DSB Backbone may be referred to interchangeably herein as Block Mobilenetv1, Block-Mobilenetv1, or simply, B-Mobilenetv1. An example embodiment of the detector 807 that employs DSBv2 as the DSB Backbone may be referred to interchangeably herein as Block Mobilenetv2, Block-Mobilenetv2, or simply, B-Mobilenetv2.

In the example embodiment of FIG. 8, the feature-generating backbone 871 outputs the feature-generating backbone features 872. The feature-generating-backbone features 872 may be the output features 657 of the DSB 660 of FIG. 6, output features 761 of the DSB 760*a* of FIG. 7A, or output features 759 of the DSB 760*b* of FIG. 7B, disclosed above, based on which example embodiment of a DSB is employed in the neural network element of the feature-generating backbone 871.

The detector 807 further includes a first regressor 873, second regressor 874, concatenator 875, and output pointwise convolutional layer and pooling layer 878. The first regressor 873 may be configured to receive features output by the feature-generating backbone, that is, the feature-generating-backbone features 872. The pooling layer of the output pointwise convolutional layer and pooling layer 878 may be any suitable type of pooling layer, such as an average pooling layer or max pooling layer.

The first regressor 873 includes at least one first sequential pairing 841 of a pointwise convolutional layer 844*a* and a depthwise convolutional layer 842*a* for a first respective dimension (not shown) of a coordinate system (not shown).

The second regressor 874 is configured to receive the features 872 output by the feature-generating backbone 871. The second regressor 874 includes at least one second sequential pairing 843 of a pointwise convolutional layer 844*c* and a depthwise convolutional layer 842*c* for a second respective dimension (not shown) of the coordinate system (not shown). The second regressor 874 may have fewer channels (not shown) of outputs than the first regressor 873. Control over such a number of channels may be controlled based on a setting of a parameter, that is, a, disclosed further below. The number of channels may correspond to a number of features. The at least one second sequential pairing 843 may be equal in number as the at least one first sequential pairing 841.

It should be understood that additional sequential pairings, such as the pointwise convolutional layer 844*b* and a depthwise convolutional layer 842*b* of the first regressor 873, and the pointwise convolutional layer 844*d* and a depthwise convolutional layer 842*d* of the second regressor 874, are optional.

The concatenator 875 is configured to concatenate features output from each depthwise convolutional layer of the first regressor 873 and the second regressor 874, that is, the output features 876*a* and 876*b* (optional) from the first regressor 873, and the output features 876*c* and 876*d* (optional) from the second regressor 874, and to output the concatenated features 877. According to an example embodiment, the first regressor 873 may output the features 876*a* and 876*b* (optional) that may be associated with the strongly constrained region 881 and the second regressor 874 may output the features 876*c* and 876*d* (optional) that may be associated with the weakly constrained region 882.

The output pointwise convolutional layer and pooling layer 878 is configured to receive the concatenated features 877 output from the concatenator 875 and produce the planar coordinates 828 for the 3D landmarks 838. The planar coordinates 828 may be output as pairs of planar coordinates (e.g., x-y pairs). The 2D image 806 and planar coordinates 828 of FIG. 8 may be input to the depth coordinate estimator 109 of FIG. 1B, for estimating a depth coordinate for each planar coordinate pair of each 3D landmark of the 3D landmarks. An example embodiment of the depth coordinate estimator 109 of FIG. 1B is disclosed with regard to FIG. 9, below.

Figure 9:
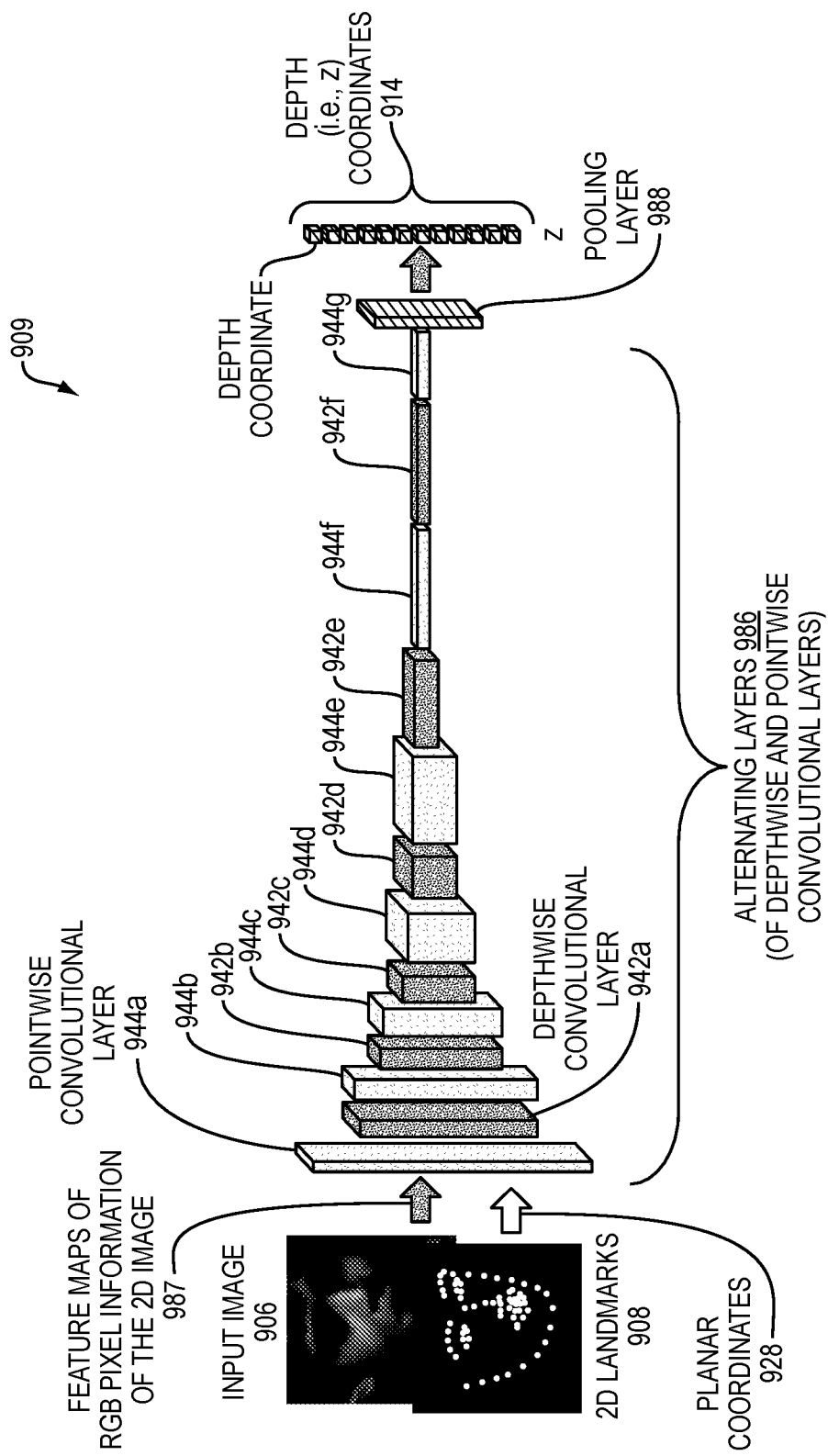
FIG. 9 is a block diagram of an example embodiment of a depth coordinate estimator.

FIG. 9 is a block diagram of an example embodiment of a depth coordinate estimator 909. Such an example embodiment may be referred to herein as an example embodiment of a framework for z coordinates prediction. The depth coordinate estimator 909 may be employed as the depth coordinate estimator 109 of FIG. 1B, disclosed above.

The depth coordinate estimator 909 includes alternating layers 986 of pointwise and depthwise convolutional layers, such as the pointwise convolutional layers 944*a-g* that alternate with the depthwise convolutional layers 942*a-f*. The depth coordinate estimator 909 includes a pooling layer 988. The pooling layer may be any suitable type of pooling layer, such as an average pooling layer or max pooling layer. The depthwise convolutional layers 942*a-g* may each downsample received features. An input to the alternating layers 986 may include (i) feature maps 987 of RGB pixel information of the 2D image 906 and (ii) the planar coordinates 928. The pooling layer 988 may be configured to receive features (not shown) of weighted pixels (not shown) associated with the landmarks 908 and output a depth coordinate associated with each landmark, that is, the depth coordinates 914. The features of the weighted pixels associated with the landmarks 908 may be output by a last pointwise convolutional layer 944*g* of the alternating layers 986.

According to another example embodiment, an augmented reality system (not shown) may comprise parallel regressors configured to produce 3D landmarks at points of highly and weakly constrained regions of a face in a 2D image and a processor, such as the central processor unit 1618 of FIG. 16, disclosed further below, configured to apply the 3D landmarks to produce an augmented reality effect in relation to the face. The augmented reality effect may be a synthesized image of the face. The augmented reality effect may be virtual makeup applied to the face. It should be understood that the augmented reality effect is not limited to a synthesized image of a face or virtual makeup applied to the face. The augmented reality system may enhance images of objects that reside in the real-world by computer-generated information. Alternatively, the augmented reality system may enhance objects that reside in a virtual world by computer-generated information.

According to another example embodiment, a neural network (not shown) may comprise alternating layers of pointwise and depthwise convolutional layers, such as disclosed above with regard to FIG. 9. The depthwise convolutional layers may each downsample received features. An input to the alternating layers may include feature maps of RGB pixel information of a 2D image and landmarks associated with the 2D image. The neural network may comprise a pooling layer, such as the pooling layer 988 of FIG. 9, configured to receive features of weighted pixels associated with the landmarks and output a depth coordinate associated with each landmark, such as the depth coordinates 914 of FIG. 9.

Further details regarding the above disclosed embodiments are disclosed below.

Face synthesis is a fascinating and popular topic in Computer Vision and Machine Learning (P. Dollár, P. Welinder, and P. Perona. Cascaded pose regression. In CVPR, pages 1078-1085. IEEE, 2010). Face alignment, as a fundamental technique of the face synthesis, has attracted a lot of efforts in past decades and has been widely applied in mobile devices, such as virtual face makeup (F. Bonetti, G. Warnaby, and L. Quinn. Augmented reality and virtual reality in physical and online retailing: A review, synthesis and research agenda. In Augmented Reality and Virtual Reality, pages 119-132. Springer, 2018), face recognition (C. Ding and D. Tao. A comprehensive survey on poseinvariant face recognition. ACM Transactions on intelligent systems and technology (TIST), 7(3):37, 2016), etc. Nevertheless, there remain many barriers involving unconstrained facial poses, complex expressions, and variable lighting conditions (S. Bazrafkan, H. Javidnia, and P. Corcoran. Face synthesis with landmark points from generative adversarial networks and inverse latent space mapping. arXiv preprint arXiv: 1802.00390, 2018). Among these factors, large facial pose is often the most important factor (C. Bhagavatula, C. Zhu, K. Luu, and M. Savvides. Faster than real-time facial alignment: A 3d spatial transformer network approach in unconstrained poses. Proc. ICCV, page to appear, 2, 2017). In recent years, deep convolutional networks have shown great ability to overcome this problem utilizing 3D information (F. Liu, D. Zeng, Q. Zhao, and X. Liu. Joint face alignment and 3d face reconstruction. In European Conference on Computer Vision, pages 545-560. Springer, 2016, A. Bulat and G. Tzimiropoulos. How far are we from solving the 2d & 3d face alignment problem? (and a dataset of 230,000 3d facial landmarks). In Computer Vision (ICCV), 2017 IEEE International Conference on, pages 1021-1030. IEEE, 2017). However, their time and space complexities often extend beyond the capabilities of many mobile and embedded devices (A. G. Howard, M. Zhu, B. Chen, D. Kalenichenko, W. Wang, T. Weyand, M. Andreetto, and H. Adam. Mobilenets: Efficient convolutional neural networks for mobile vision applications. arXiv preprint arXiv:1704.04861, 2017, M. Sandler, A. Howard, M. Zhu, A. Zhmoginov, and L.-C. Chen. Inverted residuals and linear bottlenecks: Mobile networks for classification, detection and segmentation. arXiv preprint arXiv:1801.04381, 2018, X. Zhang, X. Zhou, M. Lin, and J. Sun. Shufflenet: An extremely efficient convolutional neural network for mobile devices. In CVPR, 2018). Therefore, reducing the computational cost and storage size of deep convolutional networks becomes a useful and challenging task.

One key is to decrease the parameters for reducing time and space complexities. Usually, there are two popular strategies for decreasing the parameters in structure design. The first one is to divide the traditional convolution into two simple modules with less parameters, depthwise convolution and pointwise convolution, named depthwise separable convolution (L. Sifre and P. Mallat. Rigid-motion scattering for image classification. PhD thesis, Citeseer, 2014).

FIG. 2, disclosed above, is a block diagram 240 of an example embodiment of depthwise convolution. FIG. 3, disclosed above, is a block diagram 250 of an example embodiment of pointwise convolution.

Reducing the channels of each layer is the second strategy as it can easily drop the number of operations and parameters. Subsequently, many light-weight networks are demonstrated, such as Xception model (F. Chollet. Xception: Deep learning with depthwise separable convolutions. arXiv preprint, 2016.), Squeezenet (F. N. Iandola, S. Han, M. W. Moskewicz, K. Ashraf, W. J. Dally, and K. Keutzer. Squeezenet: Alexnet-level accuracy with 50x fewer parameters and, 0.5 mb model size. arXiv preprint arXiv: 1602.07360, 2016), Mobilenet (A. G. Howard, M. Zhu, B. Chen, D. Kalenichenko, W. Wang, T. Weyand, M. Andreetto, and H. Adam. Mobilenets: Efficient convolutional neural networks for mobile vision applications. arXiv preprint arXiv:1704.04861, 2017, M. Sandler, A. Howard, M. Zhu, A. Zhmoginov, and L.-C. Chen. Inverted residuals and linear bottlenecks: Mobile networks for classification, detection and segmentation. arXiv preprint arXiv:1801.04381, 2018), Shufflenet (X. Zhang, X. Zhou, M. Lin, and J. Sun. Shufflenet: An extremely efficient convolutional neural network for mobile devices. In CVPR, 2018, N. Ma, X. Zhang, H.-T. Zheng, and J. Sun. Shufflenet v2: Practical guidelines for efficient cnn architecture design. arXiv preprint arXiv: 1807.11164, 2018), etc. Although these networks have reduced the parameters and computational cost, they still cannot satisfy the demand of the light-weight for mobile applications based on 3D face alignment. Particularly, their performances will suffer a severe recession when their parameters are reduced to KB level. For example, reducing the channels results in that the accuracy will drop abruptly. To achieve the state-of-the-art performance while pushing the size of the model to the limit, example embodiments disclosed herein introduce the following three improvement ways. The first way is to sufficiently utilize the depthwise convolution in deep networks since it has much less computation and parameters than the pointwise convolution (A. G. Howard, M. Zhu, B. Chen, D. Kalenichenko, W. Wang, T. Weyand, M. Andreetto, and H. Adam. Mobilenets: Efficient convolutional neural networks for mobile vision applications. arXiv preprint arXiv:1704.04861, 2017). By denoting M and N as the number of the depthwise and pointwise convolutions in FIG. 4 and FIG. 5, respectively, the best ratio between M and N, that is, $M/N=3/2$, is explored herein based on the experiments disclosed further below (see Best M/N Value). A plausible reason is that the spatial correlations provided by the depthwise convolutions (F. Chollet. Xception: Deep learning with depthwise separable convolutions. In CVPR, pages 1251-1258, 2017) is more effective than the cross-channel correlations provided by pointwise convolutions due to the similarity of the main organs' spatial configuration on the faces (X. Chai, S. Shan, X. Chen, and W. Gao. Locally linear regression for pose-invariant face recognition. IEEE Transactions on image processing, 16(7): 1716-1725, 2007).

The second way is to stack the low layers into the high layers for enhancing the spatial information when reducing the channels. Essentially, reducing channels results in that the spatial information is inadequate. Thus, it is useful to enhance the information without any additional computation costs. A stacked generalization (D. H. Wolpert. Stacked generalization. Neural networks, 5(2):241-259, 1992), stacks the outputs of generalizers (e.g., classifiers (J. Li, H. Chang, and J. Yang. Sparse deep stacking network for image classification. In AAAI, pages 3804-3810, 2015) and filters (G. Huang, Z. Liu, L. Van Der Maaten, and K. Q. Weinberger. Densely connected convolutional networks. In CVPR, volume 1, page 3, 2017)) into the high layers for enhancing the spatial information and further improving their performances. Inspired by this, an example embodiment directly cascades feature maps of the low layers into the high layers in FIG. 4.

Based on the spatial configuration of the faces (T. F. Cootes, C. J. Taylor, D. H. Cooper, and J. Graham. Active shape models-their training and application. CVIU, 61(1): 38-59, 1995, T. F. Cootes, G. J. Edwards, and C. J. Taylor. Active appearance models. TPAMI, 23(6):681-685, 2001, X. Chai, S. Shan, X. Chen, and W. Gao. Locally linear regression for pose-invariant face recognition. IEEE Transactions on image processing, 16(7):1716-1725, 2007, T. Baltrušaitis, P. Robinson, and L.-P. Morency. 3d constrained local model for rigid and non-rigid facial tracking. In CVPR, pages 2610-2617. IEEE, 2012), the third way is to divide the face into strong and weak constraint regions, that is, strongly and weakly constrained regions, respectively, to handle the spatial distribution of the landmarks with the different changes by sharing an example embodiment of the network disclosed in FIG. 8, above. Specially, the strong constraint region which contains contour of the face, eye brows, nose, and eyes, has small changes in the spatial distribution of the landmarks. The weak constraint region only including mouth region in the example embodiment and has more changes and is hard to predict. To summarize, contributions of example embodiments disclosed herein include:

- An example embodiment of Depthwise and Pointwise Blocks independently stacks Depthwise and Pointwise Convolutions as disclosed in FIG. 4 and FIG. 5, respectively, and an example embodiment of a Depthwise Separable Block (DSB) reduces the parameters by stacking depthwise and pointwise blocks, and reducing the channels in FIG. 6, FIG. 7A, and FIG. 7B.
- An example embodiment of Block Mobilenet is disclosed on 3D face alignment task in FIG. 8, which is reconstructed from the Mobilenets (both Mobilenetv1 and Mobilenetv2) using DSBv1 and DSBv2. Such an example embodiment leads to an important benefit that the parameters are successfully reduced from MB to KB, and the high performance is retained.
- On the most challenging datasets, an example embodiment of Block Mobilenet obtained better results than the state-of-the-art methods. It has a lower error rate (overall Normalized Mean Error is 3.81% on 68 points AFLW2000-3D (X. Zhu, Z. Lei, X. Liu, H. Shi, and S. Z. Li. Face alignment across large poses: A 3d solution. In Proc CVPR, pages 146-155, 2016)), much faster speed (over 91 FPS on CPU), and much smaller storage size (around 876 KB).
- An example embodiment of DSB may be used to build a light weight deep network to predict the additional z-coordinate in 3D face alignment. Such an example embodiment achieves the charming performance with more than 120 FPS on one CPU.

Related Work

Disclosed below is a review of the related work on network acceleration and compression, and an overview of the state-of-the-art on face alignment is disclosed.

Time Complexity and Space Complexity

In recent years, some methods have emerged for speeding up the deep learning model. Faster activation function named rectified-linear activation function (ReLU) was proposed to accelerate the model (X. Glorot, A. Bordes, and Y. Bengio. Deep sparse rectifier neural networks. In Proceedings of the Fourteenth International Conference on Artificial Intelligence and Statistics, pages 315-323, 2011). In the work of L. Sifre et. al. (L. Sifre and P. Mallat. Rigid-motion scattering for image classification. PhD thesis, Citeseer, 2014) depthwise separable convolution was initially introduced and was used in Inception models (S. Ioffe and C. Szegedy. Batch normalization: Accelerating deep network training by reducing internal covariate shift. arXiv preprint arXiv:1502.03167, 2015), Xception network (F. Chollet. Xception: Deep learning with depthwise separable convolutions. arXiv preprint, 2016.), MobileNet (A. G. Howard, M. Zhu, B. Chen, D. Kalenichenko, W. Wang, T. Weyand, M. Andreetto, and H. Adam. Mobilenets: Efficient convolutional neural networks for mobile vision applications. arXiv preprint arXiv:1704.04861, 2017, M. Sandler, A. Howard, M. Zhu, A. Zhmoginov, and L.-C. Chen. Inverted residuals and linear bottlenecks: Mobile networks for classification, detection and segmentation. arXiv preprint arXiv:1801.04381, 2018), and Shufflenet (X. Zhang, X. Zhou, M. Lin, and J. Sun. Shufflenet: An extremely efficient convolutional neural network for mobile devices. In CVPR, 2018, F. Liu, D. Zeng, Q. Zhao, and X. Liu. Joint face alignment and 3d face reconstruction. In European Conference on Computer Vision, pages 545-560. Springer, 2016). Jin et al. (J. Jin, A. Dundar, and E. Culurciello. Flattened convolutional neural networks for feedforward acceleration. arXiv preprint arXiv:1412.5474, 2014) show the flattened convolutional neural network (CNN) structure to accelerate the feedforward procedure. A Factorized Network (J. Jin, A. Dundar, and E. Culurciello. Flattened convolutional neural networks for feedforward acceleration. CoRR, abs/1412.5474, 2014) had the similar philosophy as well as the topological connection.

A compression method of a deep neural network was introduced in (J. Ba and R. Caruana. Do deep nets really need to be deep? In Advances in neural information processing systems, pages 2654-2662, 2014), indicating that sometimes complicate deep models could be equal in performance by small models. Then Hinton et al. extended the work in (G. Hinton, O. Vinyals, and J. Dean. Distilling the knowledge in a neural network. arXiv preprint arXiv:1503.02531, 2015) with the weight transfer strategy. Squeezenet (F. N. Iandola, S. Han, M. W. Moskewicz, K. Ashraf, W. J. Dally, and K. Keutzer. Squeezenet: Alexnet-level accuracy with 50× fewer parameters and, 0.5 mb model size. arXiv preprint arXiv:1602.07360, 2016) combined such work with a fire module which has lots of 1×1 convolutional layers. Another strategy (M. Courbariaux, I. Hubara, D. Soudry, R. El-Yaniv, and Y. Bengio. Binarized neural networks: Training deep neural networks with weights and activations constrained to +1 or −1. arXiv preprint arXiv:1602.02830, 2016, M. Rastegari, V. Ordonez, J. Redmon, and A. Farhadi. Xnornet: Imagenet classification using binary convolutional neural networks. In European Conference on Computer Vision, pages 525-542. Springer, 2016) which converts the parameter from float type to binary type can compress the model significantly and achieve an impressive speed. However, the binarization would sacrifice some performance. In an example embodiment of Block Mobilenet, multiple DSB and channel reduction strategies are used to get better speed and compression ratio. An example embodiment also overcomes a significant performance drop with concatenation in an example embodiment of Block Mobilenet.

Face Alignment

Over past decades, many patch based regression methods are presented (T. F. Cootes, C. J. Taylor, D. H. Cooper, and J. Graham. Active shape models-their training and application. CVIU, 61(1):38-59, 1995, T. Baltrušaitis, P. Robinson, and L.-P. Morency. 3d constrained local model for rigid and non-rigid facial tracking. In CVPR, pages 2610-2617. IEEE, 2012). Expanded from CLM an open source framework called Openface (T. Baltrušaitis, P. Robinson, and L.-P. Morency. Openface: an open source facial behavior analysis toolkit. In WACV, pages 1-10. IEEE, 2016) was published. Some tree-based methods have emerged (V. Kazemi and J. Sullivan. One millisecond face alignment with an ensemble of regression trees. In Proc CVPR, pages 1867-1874, 2014, S. Ren, X. Cao, Y. Wei, and J. Sun. Face alignment at 3000 fps via regressing local binary features. In Proc CVPR, pages 1685-1692, 2014) using some simple features and have achieved very high speed. Based on optimization theory, a cascade of weak regressors is implemented for face alignment (X. Xiong and F. De la Torre. Supervised descent method and its applications to face alignment. In Proc CVPR, pages 532-539, 2013). Along with the rise of artificial intelligence (AI) concepts, Sun et al. (Y. Sun, X. Wang, and X. Tang. Deep convolutional network cascade for facial point detection. In Proc CVPR, pages 3476-3483, 2013) firstly employed CNN model for face alignment with a face image as the input of CNN module and regress the high-level features. MDM (G. Trigeorgis, P. Snape, M. A. Nicolaou, E. Antonakos, and S. Zafeiriou. Mnemonic descent method: A recurrent process applied for end-to-end face alignment. In Proc CVPR, pages 4177-4187, 2016) achieved good results with RNN regressor. Since the large pose problems appeared, 3D face alignment methods are proposed. Many works (Y. Liu, A. Jourabloo, W. Ren, and X. Liu. Dense face alignment. arXiv preprint arXiv: 1709.01442, 2017, X. Zhu, Z. Lei, X. Liu, H. Shi, and S. Z. Li. Face alignment across large poses: A 3d solution. In Proc CVPR, pages 146-155, 2016, A. Jourabloo and X. Liu. Large-pose face alignment via cnnbased dense 3d model fitting. In Proceedings of the IEEE Conference on Computer Vision and Pattern Recognition, pages 4188-4196, 2016) can find corresponding landmarks after 3D face model generation. (X. Zhu, Z. Lei, X. Liu, H. Shi, and S. Z. Li. Face alignment across large poses: A 3d solution. In Proc CVPR, pages 146-155, 2016) also published a dataset with 3D warped faces for large poses. With the power of deep neural network structure named Hour Glass (J. Yang, Q. Liu, and K. Zhang. Stacked hourglass network for robust facial landmark localisation. In CVPRW, pages 2025-2033. IEEE, 2017), (A. Bulat and G. Tzimiropoulos. How far are we from solving the 2d & 3d face alignment problem? (and a dataset of 230,000 3d facial landmarks). In Computer Vision (ICCV), 2017 IEEE International Conference on, pages 1021-1030. IEEE, 2017) succeeds to publish a large scale dataset and demonstrate a state-of-the-art model as the baseline. An end-to-end deep network (C. Bhagavatula, C. Zhu, K. Luu, and M. Savvides. Faster than real-time facial alignment: A 3d spatial transformer network approach in unconstrained poses. Proc. ICCV, page to appear, 2, 2017) using a simple mean shape and using a parametric, non-linear warping is presented for any face poses. Another CNN framework named Hyper-face (R. Ranjan, V. M. Patel, and R. Chellappa. Hyperface: A deep multi-task learning framework for face detection, landmark localization, pose estimation, and gender recognition. IEEE Transactions on Pattern Analysis and Machine Intelligence, 2017) is introduced in 2017 for both face landmarks localization and face pose estimation. A structure combining Heatmap regression and CNN structure is named Pose Conditioned Dendritic CNN (PCD-CNN) (A. Kumar and R. Chellappa. Disentangling 3d pose in a dendritic cnn for unconstrained 2d face alignment. arXiv preprint arXiv:1802.06713, 2018) is introduced and improve the performance from the state-of-the-art. An example embodiment of Block Mobilenet implements the depthwise convolution on face alignment task and achieves impressive performance on accuracy, speed, and storage size.

Block Mobilenet

An example embodiment of Block Mobilenet for 3D face alignment is disclosed herein. First, depthwise separable convolution is disclosed. Second, a Depthwise Separable Block (DSB) is disclosed, such as disclosed above with regard to FIGS. 6, 7A, and 7B, and the best M/N is discussed for the practice. Third, an example embodiment of an Output Module is disclosed to fit for the strong and weak constraint regions in 3D faces. Finally, an example embodiment of Block Mobilenet is constructed by using the DSB, such as disclosed with regard to FIG. 8, above. For convenience, the denotations are shown in Table 1, below.

TABLE 1

Denotations

| symbols | denotations |
| --- | --- |
| $S_{Feature}$ | the size of one feature map |
| $S_{kernel}$ | the size of one kernel |
| $C_{in}$ | the number of input channels |
| $C_{out}$ | the number of output channels |
| M | the number of layers in a Depthwise Block |
| N | the number of layers in a Pointwise Block |
| α | the parameter controlling the size of channels |
| k | the number of Depthwise Separable Blocks |
| L | the total number of layers in traditional network |

Depthwise Separable Convolution

Depthwise Separable Convolution is the key to build many light-weight neural networks (A. G. Howard, M. Zhu, B. Chen, D. Kalenichenko, W. Wang, T. Weyand, M. Andreetto, and H. Adam. Mobilenets: Efficient convolutional neural networks for mobile vision applications. arXiv preprint arXiv:1704.04861, 2017, X. Zhang, X. Zhou, M. Lin, and J. Sun. Shufflenet: An extremely efficient convolutional neural network for mobile devices. In CVPR, 2018, M. Sandler, A. Howard, M. Zhu, A. Zhmoginov, and L.-C. Chen. Inverted residuals and linear bottlenecks: Mobile networks for classification, detection and segmentation. arXiv preprint arXiv:1801.04381, 2018, N. Ma, X. Zhang, H.-T. Zheng, and J. Sun. Shufflenet v2: Practical guidelines for efficient cnn architecture design. arXiv preprint arXiv: 1807.11164, 2018). It consists of depthwise convolutional layer and pointwise convolutional layer (A. G. Howard, M. Zhu, B. Chen, D. Kalenichenko, W. Wang, T. Weyand, M. Andreetto, and H. Adam. Mobilenets: Efficient convolutional neural networks for mobile vision applications. arXiv preprint arXiv:1704.04861, 2017) shown in FIG. 2 and FIG. 3, disclosed above.

Depthwise Convolutional Layer

A depthwise convolutional layer applies a single convolutional filter to each input channel. This massively reduces the computational cost and the parameter. Particularly, the cost can be calculated as:

$$S_{Feature} \times S_{Feature} \times S_{kernel} \times S_{kernel} \times C_{out}, \quad (1)$$

where $S_{Feature}$ is the size of the feature map, $S_{kernel}$ is the size of the kernel, $C_{out}$ is the number of the output features. The amount of the parameters without bias is computed by:

$$S_{kernel} \times S_{kernel} \times C_{out}, \quad (2)$$

where $C_{out}$ is the channel number of the output.

Pointwise Convolutional Layer

A pointwise convolutional layer uses 1×1 convolution to build the new features through computing the linear combinations of all input channels. It is a kind of traditional convolution layer with the kernel size set as 1. The computational cost of the traditional convolutional layer is calculated as:

$$S_{Feature} \times S_{Feature} \times S_{kernel} \times S_{kernel} \times C_{in} \times C_{out}. \quad (3)$$

Since no bias is assumed, the parameters for the traditional layer is computed by $S_{kernel} \times S_{kernel} \times C_{in} \times C_{out}$. Due to $S_{kernel}=1$ in pointwise layer, and its computational cost can be computed as $S_{Feature} \times S_{Feature} \times C_{in} \times C_{out}$, and the parameters as $C_{in} \times C_{out}$. Because $C_{in}$ is usually much larger than $S_{kernel}^2$ in the depthwise layer, the depthwise convolution is more efficient than pointwise convolution on computational cost and parameters.

Depthwise Separable Block

Similar to the depthwise separable convolution, an example embodiment of DSB is constructed with a Depthwise Block and a Pointwise Block. A concatenation is used in the Depthwise Block connecting the first layer through the last layer. The following discloses example embodiment of the basic blocks, and then discloses the details of example embodiments of DSBv1 and DSBv2.

Depthwise Block is constructed by several depthwise convolutions to make the most use of the depthwise convolutions as shown in FIG. 4. A parameter M is set to control the number of depthwise layers. In the module, the stride of the first layer is set to 2 for downsampling. The rest of the layers have the same kernel size, but their stride sizes are 1. In one module, the channel number of each depthwise layer is the same. To enhance the ability of anti-overfitting, batch normalization after the depthwise layer is used as well as ReLU6 (M. Sandler, A. Howard, M. Zhu, A. Zhmoginov, and L.-C. Chen. Inverted residuals and linear bottlenecks: Mobile networks for classification, detection and segmentation. arXiv preprint arXiv:1801.04381, 2018) as the non-linearity.

Based on the Eq. 1, the computational cost of the depthwise module is $M \times S_{kernel}^2 \times S_{Feature}^2 \times C_{out}$. To simplify the parameters calculation, it is assumed that there is no bias in the layer. Based on the Eq. 2, the parameters amount is $M \times S_{kernel}^2 \times C_{out}$. To control the channel quantities, a parameter $\alpha$ is set in each layer. Considering the effect of $\alpha$, the computation cost of the depthwise module is $M \times \alpha \times S_{Feature}^2 \times S_{kernel}^2 \times C_{out}$, and its parameter quantity is $M \times \alpha \times S_{kernel}^2 \times C_{out}$.

A concatenation operation is set to enrich the input information of the Pointwise Block using previous feature maps (J. Li, H. Chang, and J. Yang. Sparse deep stacking network for image classification. In AAAI, pages 3804-3810, 2015). Sandler et al. (M. Sandler, A. Howard, M. Zhu, A. Zhmoginov, and L.-C. Chen. Inverted residuals and linear bottlenecks: Mobile networks for classification, detection and segmentation. arXiv preprint arXiv:1801.04381, 2018) has shown that sufficiently large expansion layers can resist the information loss caused by ReLU activation functions. Another operation to prevent the collapse of the input manifold is adding previous tensors to current tensors (K. He, X. Zhang, S. Ren, and J. Sun. Deep residual learning for image recognition. In Proceedings of the IEEE conference on computer vision and pattern recognition, pages 770-778, 2016). To explore the more effective operation, a comparison of different operations for channel combination was performed. The results shown in Table 2 experimentally confirm an intuition regarding same.

TABLE 2

| Models | mean NME | Speed | parameters (Bytes) |
|---|---|---|---|
| ($\alpha = 1$)DSBv1 (None) | 3.85% | 42 FPS | 2.5M |
| ($\alpha = 0.5$)DSBv1 (Add) | 4.45% | 71.3 FPS | 660K |
| ($\alpha = 0.5$)DSBv1(Concat) | 3.89% | 58.8 FPS | 960K |

Table 2 discloses comparison results of different operation when $\alpha=0.5$. The parameter $\alpha$ is set as $\alpha=1$ as the baseline. The mean NME is tested on AFLW2000-3D (X. Zhu, Z. Lei, X. Liu, H. Shi, and S. Z. Li. Face alignment across large poses: A 3d solution. In Proc CVPR, pages 146-155, 2016). With the concatenation, an example embodiment achieves similar results with the model before the channel reduction. Therefore, an example embodiment concatenates the feature maps of the first through last layer in the Depthwise Block, as disclosed in FIG. 4.

Pointwise Block

An example embodiment of a Pointwise Block aims to connect the information of each input features sufficiently. According to an example embodiment, a parameter N is used to control the number of pointwise convolutional layers in this module. The same parameter $\alpha$ is also used to control the channel amount of each pointwise layer. The input channel and output channel are the same for all layers. Since the concatenation in Depthwise Block is activated only when the $\alpha$ is small, the increase of the computational cost and parameters is affordable to retain the accuracy. There is no concatenation in the Pointwise Block because the feature maps can be projected to high dimension space by pointwise layers. The computational cost of the pointwise block is $N \times S_{Feature}^2 \times \alpha^2 \times C_{in} \times C_{out}$. It is assumed that there is no bias in the layer. The parameters amount is $N \times \alpha \times C_{out}$.

Inspired by two version of Mobilenet (A. G. Howard, M. Zhu, B. Chen, D. Kalenichenko, W. Wang, T. Weyand, M. Andreetto, and H. Adam. Mobilenets: Efficient convolutional neural networks for mobile vision applications. arXiv preprint arXiv:1704.04861, 2017, M. Sandler, A. Howard, M. Zhu, A. Zhmoginov, and L.-C. Chen. Inverted residuals and linear bottlenecks: Mobile networks for classification, detection and segmentation. arXiv preprint arXiv:1801.04381, 2018), an example embodiment discloses two versions of Depthwise Separable Block for different architectures. DSBv1 and DSBv2 are constructed by the Depthwise Block and Pointwise Block. DSBv1 is similar to the depthwise separable convolution. It has one Depthwise Block and one Pointwise Block as shown in FIG. 6. DSBv2 is similar to the Linear Bottlenecks in MobileNetv2 (M. Sandler, A. Howard, M. Zhu, A. Zhmoginov, and L.-C. Chen. Inverted residuals and linear bottlenecks: Mobile networks for classification, detection and segmentation. arXiv preprint arXiv:1801.04381, 2018). It also has a pointwise layer to expand the dimension of the input feature maps. A Depthwise Block is utilized after the channel expansion. Then a Pointwise Block is implemented as a bottleneck of the DSBv2. The visualization of the structure is shown in FIG. 7A and FIG. 7B. DSBv2 also has a residual shortcut when the size (e.g., number) of the input features is the same as the output features.

Best M/N Value

The following discloses experiments used to determine M/N. An example embodiment of Block Mobilenet includes three parameters: the layer number in the depthwise convolutional module M, the layer number in the pointwise convolutional module N, and the channel multiplier $\alpha$. In this section, $\alpha$ is fixed to 1. From the discussion in depthwise separable convolution, M should be larger than N to reduce the computational cost and parameters. To find the best ratio of M/N, an experiment on an example embodiment of Block Mobilenetv1 with different ratios of M/N was performed. Note that a concatenation module and the output block specified for faces was not used in the experiment. In the experiment, the final 10 layers (5 depthwise layers and 5 pointwise layers) in Mobilenetv1 were replaced with an example embodiment of Depthwise Block and Pointwise Block. The experiment results are disclosed in FIGS. 10A-C.

Figures 10A, 10B, 10C:
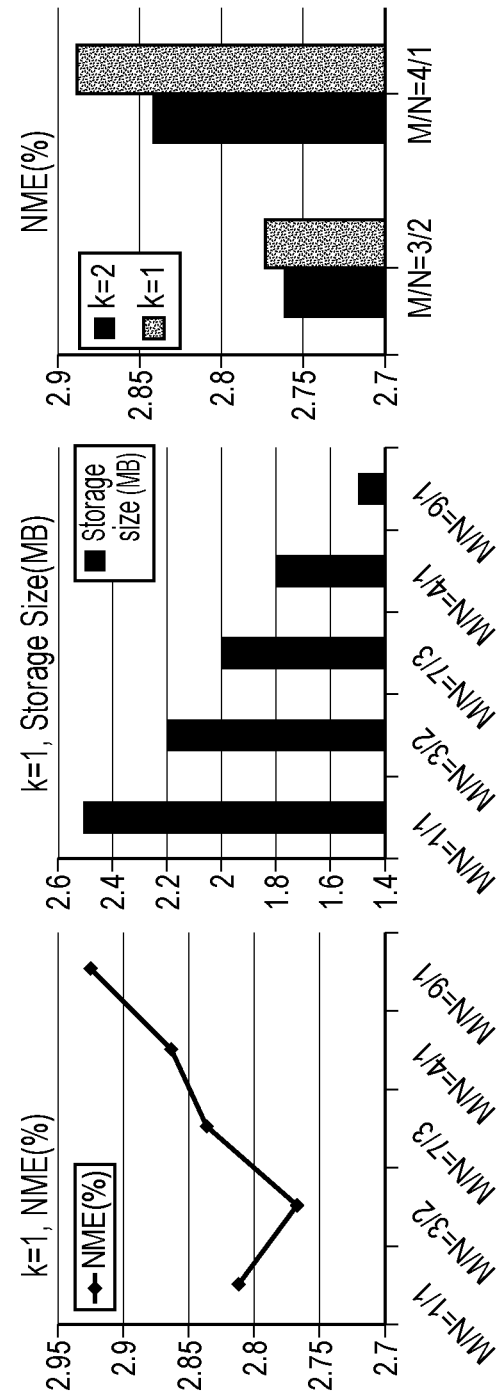
FIGS. 10A-C are graphs of results with different ratios of M/N.

FIGS. 10A-C are graphs of results with different ratios of M/N. M/N=1 equals to the baseline of Mobilenetv1 (A. G. Howard, M. Zhu, B. Chen, D. Kalenichenko, W. Wang, T. Weyand, M. Andreetto, and H. Adam. Mobilenets: Efficient convolutional neural networks for mobile vision applications. arXiv preprint arXiv:1704.04861, 2017.). Note that M/N=6/4 and M/N=3/2 means different topology since they have different number of blocks. The comparison results are shown in FIG. 10C. The M/N ratio used in Block Mobilenetv2 is 3/2.

Output Module

In this subsection, an example embodiment of an output module specified for face alignment is constructed. The output module is designed based on the spatial configuration of faces in order to resist accuracy loss caused by the significant reduction of parameters. An example embodiment of the detailed structure is disclosed in FIG. 8. A pointwise layer and a depthwise layer are utilized for the coordinates prediction on one axis. A concatenation module is placed afterwards to concatenate the output together. Finally, a pointwise layer is implemented to construct the relationship between different axes and different regions. The comparison results are shown in Table 3 which indicates that the example embodiment of the output module can improve the performance on accuracy, speed, and storage size.

TABLE 3

| Modules with different operations | mean NME | Speed | parameters (Bytes) |
|---|---|---|---|
| (a = 1)DSBv1(D-conv and P-conv) | 3.78% | 42 FPS | 2.5M |
| (a = 1)DSBv1 (Output Module) | 3.75% | 46 FPS | 1.6M |
| (a = 0.5)DSBv1(D-conv and P-conv) | 3.89% | 58 FPS | 960K |
| (a = 0.5)DSBv1 (Output Module) | 3.81% | 91 FPS | 876K |

Table 3 compares results with different output modules when $\alpha=0.5$ and $\alpha=1$. The D-conv and P-cony represent the same last two modules as Mobilenetv1 (A. G. Howard, M. Zhu, B. Chen, D. Kalenichenko, W. Wang, T. Weyand, M. Andreetto, and H. Adam. Mobilenets: Efficient convolutional neural networks for mobile vision applications. arXiv preprint arXiv:1704.04861, 2017). The mean NME is tested on AFLW2000-3D (X. Zhu, Z. Lei, X. Liu, H. Shi, and S. Z. Li. Face alignment across large poses: A 3d solution. In Proc CVPR, pages 146-155, 2016).

Block Mobilenet Architecture

Example embodiments of Block Mobilenetv1 and Block Mobilenetv2 constructed by DSB and the Output Module are disclosed in further detail below.

FIG. 11 is a Table 1100 (referred to interchangeably herein as Table 4) of comparison results among traditional convolutions, Mobilenet, and an example embodiment of Block Mobilenet on time complexity and space complexity. In the experiment, each of the traditional layers has the same number of input channels and output channels. It is assumed that the traditional network has 5 layers, and each layer has no bias. Then the Mobilenet should have 5 depthwise layers and 5 pointwise layers, and the M+N in an example embodiment of Block Mobilenet should be equal to 10. The parameter $\alpha$ can be set to 0.5 to reduce the channels. From Table 4, that is, Table 1100 of FIG. 11, the example embodiment of Block Mobilenet is shown to have advantages on both time complexity and space complexity.

An example embodiment of Block Mobilenetv1 may be constructed based on Mobilenetv1 by stacking the DSBv1 from low dimension to high dimension as its backbone. An example embodiment of the basic structure of Block Mobilenetv1 is disclosed in FIG. 6. The details of its architecture are disclosed in Table 5. At the end of the architecture an example embodiment uses an example output module for the coordinates prediction, as disclosed in FIG. 8.

TABLE 5

Block Mobilenetv1 Architecture

| input | operator | stride | kernels | output |
|---|---|---|---|---|
| $224^2 \times 3$ | conv2d | 2 | $3 \times 3$ | $112^2 \times 16$ |
| $112^2 \times 16$ | convdw | 1 | $3 \times 3$ | $112^2 \times 16$ |
| $112^2 \times 16$ | convpw | 1 | $1 \times 1$ | $112^2 \times 32$ |
| $112^2 \times 32$ | convdw | 2 | $3 \times 3$ | $56^2 \times 32$ |
| $56^2 \times 32$ | convpw | 1 | $1 \times 1$ | $56^2 \times 64$ |
| $56^2 \times 64$ | convdw | 1 | $3 \times 3$ | $56^2 \times 64$ |
| $56^2 \times 64$ | convpw | 1 | $1 \times 1$ | $56^2 \times 64$ |
| $56^2 \times 64$ | DSBv1 (M/N = 3/2) | 2, 1, 1, 1, 1 | — | $28^2 \times 256$ |
| $28^2 \times 256$ | DSBv1 (M/N = 3/2) | 2, 1, 1, 1, 1 | — | $14^2 \times 256$ |
| $14^2 \times 256$ | DSBv1 (M/N = 3/2) | 1, 1, 1, 1, 1 | — | $14^2 \times 256$ |
| $14^2 \times 256$ | Output Block | — | — | $7^2 \times 136$ |
| $7^2 \times 136$ | avg pool | — | $7 \times 7$ | $1^2 \times 136$ |

Linear Regression output

An example embodiment of Block Mobilenetv2 is built with DSBv2 using the same topology of Mobilenetv2. In the example embodiment, the depthwise layer and the last linear pointwise layer are replaced with DSBv2 and the first pointwise layer for channel expansion (M. Sandler, A. Howard, M. Zhu, A. Zhmoginov, and L.-C. Chen. Inverted residuals and linear bottlenecks: Mobile networks for classification, detection and segmentation. arXiv preprint arXiv: 1801.04381, 2018) is kept. An example embodiment of the basic structures of Block Mobilenetv2 are disclosed in FIG. 8. Note that Mobilenetv1 and Mobilenetv2 are the special cases when M and N equal 1. The inverted residual blocks are replaced by an example embodiment of DSBv2 only when the number of blocks are larger than 2. An example embodiment uses 2 DSBv2 to replace 3 Bottleneck structures. The details of an example embodiment of the architecture are disclosed in Table 6. Same as the B-Mobilenetv1, an example embodiment of an output module disclosed herein is used as the final module to predict the landmark. Note that the stride size in the output module is 1.

TABLE 6

Block Mobilenetv2 Architecture.
Bottleneck is the basic structure in Mobilenetv2.

| input | operator | t | c | n | s |
|---|---|---|---|---|---|
| $224^2 \times 3$ | conv2d | — | 16 | 1 | 2 |
| $112^2 \times 16$ | bottleneck | 1 | 8 | 1 | 1 |
| $112^2 \times 8$ | bottleneck | 6 | 12 | 2 | 2 |
| $56^2 \times 12$ | bottleneck | 6 | 16 | 3 | 2 |
| $28^2 \times 16$ | DSBv2 (M/N = 3/2) | 6 | 32 | 2 | 1 |
| $14^2 \times 32$ | DSBv2 (M/N = 3/2) | 6 | 48 | 2 | 2 |
| $14^2 \times 48$ | DSBv2 (M/N = 3/2) | 6 | 80 | 2 | 2 |
| $7^2 \times 80$ | bottleneck | 6 | 160 | 1 | 1 |
| $7^2 \times 160$ | Output Block | — | — | 1 | — |
| $7^2 \times 136$ | avg pool | — | 136 | 1 | — |

Linear Regression output z coordinates prediction is necessary for 3D Face Alignment. Since the x-y coordinates can be accurately predicted by an example embodiment of Block Mobilenet, an example embodiment can use a light and fast framework for only z coordinates prediction. An example embodiment of the framework is disclosed in FIG. 9, disclosed above. An additional channel may be generated by drawing Gaussian heatmaps around landmarks with the radium set to 7. Then it will be passed to the z framework stacked with the input image.

Experiment

In this section, first the datasets, evaluation metrics, and hyper-parameter settings on face alignment task are disclosed. Second, a comparison of results on accuracy among an example embodiment of the framework disclosed herein and other state-of-the-art techniques quantitatively and visually. At last, the time complexity and space complexity of example embodiments of methods as well as different baselines are disclosed.

Experiment Settings

According to the face alignment experiments, all the baselines use 68-point landmarks to conduct fair comparisons, though the landmarks number are quite flexible in an example embodiment of the framework. Since some datasets (A. Bulat and G. Tzimiropoulos. How far are we from solving the 2d & 3d face alignment problem? (and a dataset of 230,000 3d facial landmarks). In Computer Vision (ICCV), 2017 IEEE International Conference on, pages 1021-1030. IEEE, 2017) used only have 2D coordinates projected from 3D landmarks, all the baselines are evaluated with only x-y coordinates. Training datasets and testing datasets are detailed below:

- 300 W-LP includes 61225 samples across large poses from entirely four parts (1,786 from IBUG, 5,207 from AFW, 16,556 from LFPW and 37,676 from HELEN) (X. Zhu, Z. Lei, X. Liu, H. Shi, and S. Z. Li. Face alignment across large poses: A 3d solution. In Proc CVPR, pages 146-155, 2016). This dataset is employed for detection training.
- AFLW2000-3D (X. Zhu, Z. Lei, X. Liu, H. Shi, and S. Z. Li. Face alignment across large poses: A 3d solution. In Proc CVPR, pages 146-155, 2016) has 1306 faces in [0°, 30°], 462 faces in [30°, 60°], and 232 faces in [60°, 90°]. This dataset is used for testing with 2000 images in total, and to evaluate example embodiments of frameworks disclosed herein in different angles to analyze if the example embodiments of the framework can handle large poses.
- Re-annotated AFLW2000-3D (A. Bulat and G. Tzimiropoulos. How far are we from solving the 2d & 3d face alignment problem? (and a dataset of 230,000 3d facial landmarks). In Computer Vision (ICCV), 2017 IEEE International Conference on, pages 1021-1030. IEEE, 2017) is re-annotated from AFLW2000-3D given 2D landmarks. It corrects some samples with bad ground truth using 3DFAN (A. Bulat and G. Tzimiropoulos. How far are we from solving the 2d & 3d face alignment problem? (and a dataset of 230,000 3d facial landmarks). In Computer Vision (ICCV), 2017 IEEE International Conference on, pages 1021-1030. IEEE, 2017). It only has x and y coordinates. An example of a detection module is compared on this dataset with those 3D face alignment baselines.
- LS3D-W is also a re-annotated by Bulat et al. (A. Bulat and G. Tzimiropoulos. How far are we from solving the 2d & 3d face alignment problem? (and a dataset of 230,000 3d facial landmarks). In Computer Vision (ICCV), 2017 IEEE International Conference on, pages 1021-1030. IEEE, 2017). This dataset is used for training and testing to make a fair comparison. The sub-dataset Menpo-3D (8,955 images), 300 W-3D (600 images) is used for testing. Note this dataset only has 2D landmarks projected from 3D. This dataset is used to test an example embodiment of Block Mobilenet and other baselines using its three categories (A, B, and C) with 64 videos in total.

Evaluation Metrics

For 3D face alignment, the negative effects of face detection should be neglected. Thus, the detected bounding box of each face is computed by ground-truth landmarks. Such ground-truth landmarks are human labelled landmarks. To compare with other methods, the metric "Normalized Mean Error (NME)" is used for all methods. It is defined as:

$$NME = \frac{1}{\text{Sum}} \Sigma_{i=1}^{Sum} \frac{\|\hat{X}_t - X_t^*\|_2}{d}$$

where the $\hat{X}$ and $X^*$ are predicted and ground truth landmarks, respectively, Sum is the number of the landmarks, d is normalized distance and which be computed by the width and height of the bounding box using $d=\sqrt{w_{bbox} \times h_{bbox}}$. The lower NME means the higher accuracy. Note that only x and y coordinates are considered for evaluation for fair comparison. Also disclosed is the curve of cumulative errors distribution (CED) and the failure threshold is set as 7%. The CED curve indicates the percentage of successful cases in the test dataset. Notably, the threshold can be changed to find the percentage of good performance cases in the test datasets, which is set as 3%. The speed of all methods is evaluated on Intel® Core™ i7 processor without Openmpi in mxnet (T. Chen, M. Li, Y. Li, M. Lin, N. Wang, M. Wang, T. Xiao, B. Xu, C. Zhang, and Z. Zhang. Mxnet: A flexible and efficient machine learning library for heterogeneous distributed systems. arXiv preprint arXiv:1512.01274, 2015). The storage size disclosed herein is calculated from the compressed model generated from the source code.

Comparison Methods

Comprehensive evaluations were conducted with the state-of-the-art methods. All methods are trained on the 300 W-LP dataset including both an example embodiment and others. All of the input faces are cropped by the bounding box calculated from landmarks. All competitive methods have released their codes and, thus, their models can be optimized on 300 W-LP for a fair comparison. The competitive deep methods include deep based models (X. Zhu, Z. Lei, X. Liu, H. Shi, and S. Z. Li. Face alignment across large poses: A 3d solution. In Proc CVPR, pages 146-155, 2016, G. Trigeorgis, P. Snape, M. A. Nicolaou, E. Antonakos, and S. Zafeiriou. Mnemonic descent method: A recurrent process applied for end-to-end face alignment. In Proc CVPR, pages 4177-4187, 2016, A. Bulat and G. Tzimiropoulos. How far are we from solving the 2d & 3d face alignment problem? (and a dataset of 230,000 3d facial landmarks). In Computer Vision (ICCV), 2017 IEEE International Conference on, pages 1021-1030. IEEE, 2017, R. Ranjan, V. M. Patel, and R. Chellappa. Hyperface: A deep multi-task learning framework for face detection, landmark localization, pose estimation, and gender recognition. IEEE Transactions on Pattern Analysis and Machine Intelligence, 2017, C. Bhagavatula, C. Zhu, K. Luu, and M. Savvides. Faster than real-time facial alignment: A 3d spatial transformer network approach in unconstrained poses. Proc. ICCV, page to appear, 2, 2017, A. Kumar and R. Chellappa. Disentangling 3d pose in a dendritic cnn for unconstrained 2d face alignment. arXiv preprint arXiv:1802.06713, 2018, X. Zhu, X. Liu, Z. Lei, and S. Z. Li. Face alignment in full pose range: A 3d total solution. IEEE transactions on pattern analysis and machine intelligence, 41(1):78-92, 2019), some traditional methods (X. Xiong and F. De la Torre. Supervised descent method and its applications to face alignment. In Proc CVPR, pages 532-539, 2013, V. Kazemi and J. Sullivan. One millisecond face alignment with an ensemble of regression trees. In Proc CVPR, pages 1867-1874, 2014, X. Cao, Y. Wei, F. Wen, and J. Sun. Face alignment by explicit shape regression. International Journal of Computer Vision, 107(2):177-190, 2014), and the state-of-the-art light-weight models (F. N. Iandola, S. Han, M. W. Moskewicz, K. Ashraf, W. J. Dally, and K. Keutzer. Squeezenet: Alexnet-level accuracy with 50× fewer parameters and 0.5 mb model size. arXiv preprint arXiv:1602.07360, 2016, F. Chollet. Xception: Deep learning with depthwise separable convolutions. In CVPR, pages 1251-1258, 2017, X. Zhang, X. Zhou, M. Lin, and J. Sun. Shufflenet: An extremely efficient convolutional neural network for mobile devices. In CVPR, 2018, G. Huang, Z. Liu, L. Van Der Maaten, and K. Q. Weinberger. Densely connected convolutional networks. In CVPR, volume 1, page 3, 2017, M. Sandler, A. Howard, M. Zhu, A. Zhmoginov, and L.-C. Chen. Inverted residuals and linear bottlenecks: Mobile networks for classification, detection and segmentation. arXiv preprint arXiv:1801.04381, 2018, N. Ma, X. Zhang, H. T. Zheng, and J. Sun. Shufflenet v2: Practical guidelines for efficient cnn architecture design. arXiv preprint arXiv:1807.11164, 2018).

Hyper-Parameter Settings

An example embodiment of structures are built by Mxnet framework (T. Chen, M. Li, Y. Li, M. Lin, N. Wang, M. Wang, T. Xiao, B. Xu, C. Zhang, and Z. Zhang. Mxnet: A flexible and efficient machine learning library for heterogeneous distributed systems. arXiv preprint arXiv: 1512.01274, 2015). An example embodiment uses Adam stochastic optimization (D. Kingma and J. Ba. Adam: A method for stochastic optimization. arXiv preprint arXiv: 1412.6980, 2014) with default hyper-parameters to learn the weights. The initial learning rate is set to 0.0005, and the initialized weights are generated with Xavier initialization. The epoch is set to 60, and the batch size is set to 100. The learning rate is set to $4e^{-4}$ at first 15 epoch and then decay the it to $2e^{-4}$ when the channel multiplier $\alpha$ is set to 0.5.

Comparison with the State-of-the-Art

In this subsection, an example embodiment of the Block Mobilenet framework is compared with the existing state-of-the-art methods.

FIGS. 12A-G are graphs that include CED curves on different test datasets. In the graphs of FIGS. 12A-G, the CED curve 1291 corresponds with an example embodiment of Block-Mobilenetv1 and the CED curve 1292 corresponds with an example embodiment of Block-Mobilenetv2. The 3D methods are tested on whole datasets of AFLW2000-3D (X. Zhu, Z. Lei, X. Liu, H. Shi, and S. Z. Li. Face alignment across large poses: A 3d solution. In Proc CVPR, pages 146-155, 2016.), re-annotated AFLW2000-3D, Menpo-3D, 300 W-3D, and 300VW-3D (A. Bulat and G. Tzimiropoulos. How far are we from solving the 2d & 3d face alignment problem? (and a dataset of 230,000 3d facial landmarks). In Computer Vision (ICCV), 2017 IEEE International Conference on, pages 1021-1030. IEEE, 2017.).

The CED curves of the whole dataset are disclosed in FIG. 12A. According to the description of (A. Bulat and G. Tzimiropoulos. How far are we from solving the 2d & 3d face alignment problem? (and a dataset of 230,000 3d facial landmarks). In Computer Vision (ICCV), 2017 IEEE International Conference on, pages 1021-1030. IEEE, 2017), it is acknowledged that there are some wrong labels due to the automatic annotation process of (X. Zhu, Z. Lei, X. Liu, H. Shi, and S. Z. Li. Face alignment across large poses: A 3d solution. In Proc CVPR, pages 146-155, 2016). To make a fair comparison, a comparison is also made on the re-annotated AFLW2000-3D dataset (A. Bulat and G. Tzimiropoulos. How far are we from solving the 2d & 3d face alignment problem? (and a dataset of 230,000 3d facial landmarks). In Computer Vision (ICCV), 2017 IEEE International Conference on, pages 1021-1030. IEEE, 2017). The CED curves are shown in FIG. 12B. The results of 3D face alignment methods are also compared with an example embodiment on the 300-W-3D dataset, Menpo-3D dataset, and 300VW3D test sets (A. Bulat and G. Tzimiropoulos. How far are we from solving the 2d & 3d face alignment problem? (and a dataset of 230,000 3d facial landmarks). In Computer Vision (ICCV), 2017 IEEE International Conference on, pages 1021-1030. IEEE, 2017). The results are shown in FIG. 12C, FIG. 12D, FIG. 12E, FIG. 12F, and FIG. 12E. The visualization comparison results are shown in FIG. 13.

Figure 13:
FIG. 13 is a table of images that shows a visualized comparison of results obtained via an example embodiment versus results obtained via existing state-of-the-art methods.

FIG. 13 is a table of images that shows a visualized comparison of results obtained via an example embodiment versus results obtained via existing state-of-the-art methods. From top to bottom: SDM (X. Xiong and F. De la Torre. Supervised descent method and its applications to face alignment. In Proc CVPR, pages 532-539, 2013.); MDM (G. Trigeorgis, P. Snape, M. A. Nicolaou, E. Antonakos, and S. Zafeiriou. Mnemonic descent method: A recurrent process applied for end-to-end face alignment. In Proc CVPR, pages 4177-4187, 2016); 3DDFA (X. Zhu, Z. Lei, X. Liu, H. Shi, and S. Z. Li. Face alignment across large poses: A 3d solution. In Proc CVPR, pages 146-155, 2016.); 3DFAN (A. Bulat and G. Tzimiropoulos. How far are we from solving the 2d & 3d face alignment problem? (and a dataset of 230,000 3d facial landmarks). In Computer Vision (ICCV), 2017 IEEE International Conference on, pages 1021-1030. IEEE, 2017.); an example embodiment of Block-Mobilenet.

The comparison results of x-y coordinates are shown in Table 7. For light-weight baseline methods, it can be observed that example embodiments of B-Mobilenetv1 and B-Mobilenetv2 achieve the best performance (<4 mean NME) with ≤876 KB parameters.

TABLE 7

Comparisons with state-of-the-art methods on AFLW2000-3D dataset.

| | Normalized Mean Error on ALFW2000-3D | | | | Time Complexity | | Space Complexity |
|---|---|---|---|---|---|---|---|
| Methods | [0°30°] | [30°60°] | [60°90°] | Mean | GPU (FPS) | CPU (FPS) | parameters (Bytes) |
| Zhu et. al. | 2.84 | 3.57 | 4.96 | 3.79 | 15 | 8 | 12.6M |
| PCD-CNN | 2.93 | 4.14 | 4.71 | 3.92 | 20 | — | — |
| Hyperface | 3.93 | 4.14 | 6.71 | 4.26 | — | — | 119.7M |

TABLE 7-continued

Comparisons with state-of-the-art methods on AFLW2000-3D dataset.

| Methods | Normalized Mean Error on ALFW2000-3D | | | | Time Complexity | | Space Complexity |
|---|---|---|---|---|---|---|---|
| | [0°30°] | [30°60°] | [60°90°] | Mean | GPU (FPS) | CPU (FPS) | parameters (Bytes) |
| 3DSTN | 3.15 | 4.33 | 5.98 | 4.49 | 52 | — | — |
| 3DFAN | 2.75 | 3.76 | 5.72 | 4.07 | 6.7 | <1 | 183M |
| 3DDFA | 3.78 | 4.54 | 7.93 | 5.42 | 43.5 | 13 | 111M |
| 3DDFA + SDM | 3.43 | 4.24 | 7.17 | 4.94 | 11.8 | 8.95 | 121M |
| MDM | 3.67 | 5.94 | 10.76 | 6.45 | 5.1 | <1 | 307M |
| ERT | 5.40 | 7.12 | 16.01 | 10.55 | — | 300 | 95M |
| ESR | 4.60 | 6.70 | 12.67 | 7.99 | — | 83 | 248M |
| SDM | 3.67 | 4.94 | 9.76 | 6.12 | — | 80 | 10M |
| Squeezenet ($\alpha = 1$) | 2.82 | 4.26 | 6.22 | 4.27 | >500 | 38 | 2.9M |
| Xception ($\alpha = 0.5$) | 2.40 | 3.21 | 5.25 | 3.62 | 60 | 6 | 5.9M |
| Shufflenetv1 ($\alpha = 1$) | 3.03 | 4.01 | 6.07 | 4.37 | >900 | 104 | 2.1M |
| Shufflenetv2 ($\alpha = 1$) | 2.34 | 3.52 | 5.51 | 3.79 | >600 | 51 | 3.3M |
| Mobilenetv1 ($\alpha = 1$) | 2.52 | 3.21 | 5.76 | 3.85 | >900 | 45 | 2.5M |
| Mobilenetv2 ($\alpha = 1$) | 2.39 | 2.95 | 5.50 | 3.61 | >820 | 44 | 2.3M |
| Squeezenet ($\alpha = 0.5$) | 3.55 | 5.10 | 7.10 | 5.25 | >900 | 76 | 775K |
| Xception ($\alpha = 0.25$) | 2.87 | 3.71 | 5.65 | 4.07 | >100 | 17 | 984K |
| Shufflenetv1 ($\alpha = 0.5$) | 3.25 | 4.54 | 7.02 | 4.93 | >900 | 152 | 682K |
| Shufflenetv2 ($\alpha = 0.5$) | 2.96 | 4.00 | 6.00 | 4.32 | >900 | 125 | 719K |
| Mobilenetv1 ($\alpha = 0.5$) | 3.12 | 4.07 | 6.02 | 4.40 | >900 | 117 | 514K |
| Mobilenetv2 ($\alpha = 0.5$) | 2.84 | 4.03 | 5.92 | 4.26 | >600 | 52 | 625K |
| B-Mobilenetv1 ($\alpha = 1$) | 2.31 | 3.38 | 5.58 | 3.75 | >900 | 46 | 1.6M |
| B-Mobilenetv2 ($\alpha = 1$) | 2.38 | 3.00 | 5.41 | 3.60 | >850 | 45 | 1.9M |
| B-Mobilenetv1 ($\alpha = 0.5$) | 2.50 | 3.57 | 5.35 | 3.81 | >900 | 91 | 876K |
| B-Mobilenetv2 ($\alpha = 0.5$) | 2.55 | 3.65 | 5.28 | 3.82 | >600 | 55 | 638K |
| B-Mobilenetv1 ($\alpha = 0.375$) | 2.66 | 3.86 | 5.65 | 4.05 | >900 | 112 | 505K |

From up to down, the results are reported using the state-of-the-art face alignment methods for large poses, the light-weight networks trained on AFLW2000-3D, and an example embodiment of Block Mobilenet, respectively. It is clear that the example embodiment of Block Mobilenet not only has the KB-level parameters, but also retains the high performance.

In Table 7, the methods are Zhu et al. (X. Zhu, X. Liu, Z. Lei, and S. Z. Li. Face alignment in full pose range: A 3d total solution. IEEE transactions on pattern analysis and machine intelligence, 41(1):78-92, 2019), PCD-CNN (A. Kumar and R. Chellappa. Disentangling 3d pose in a dendritic cnn for unconstrained 2d face alignment. arXiv preprint arXiv:1802.06713, 2018), Hyperface (R. Ranjan, V. M. Patel, and R. Chellappa. Hyperface: A deep multi-task learning framework for face detection, landmark localization, pose estimation, and gender recognition. IEEE Transactions on Pattern Analysis and Machine Intelligence, 2017), 3DSTN (C. Bhagavatula, C. Zhu, K. Luu, and M. Savvides. Faster than real-time facial alignment: A 3d spatial transformer network approach in unconstrained poses. Proc. ICCV, page to appear, 2, 2017), 3DFAN (A. Bulat and G. Tzimiropoulos. How far are we from solving the 2d & 3d face alignment problem? (and a dataset of 230,000 3d facial landmarks). In Computer Vision (ICCV), 2017 IEEE International Conference on, pages 1021-1030. IEEE, 2017), 3DDFA (X. Zhu, Z. Lei, X. Liu, H. Shi, and S. Z. Li. Face alignment across large poses: A 3d solution. In Proc CVPR, pages 146-155, 2016), 3DDFA+SDM (X. Zhu, Z. Lei, X. Liu, H. Shi, and S. Z. Li. Face alignment across large poses: A 3d solution. In Proc CVPR, pages 146-155, 2016," "MDM," that is "G. Trigeorgis, P. Snape, M. A. Nicolaou, E. Antonakos, and S. Zafeiriou. Mnemonic descent method: A recurrent process applied for end-to-end face alignment. In Proc CVPR, pages 4177-4187, 2016), ERT (V. Kazemi and J. Sullivan. One millisecond face alignment with an ensemble of" regression trees. In Proc CVPR, pages 1867-1874, 2014), ESR (X. Cao, Y. Wei, F. Wen, and J. Sun. Face alignment by explicit shape regression. International Journal of Computer Vision, 107(2):177-190, 2014), SDM (X. Xiong and F. De la Torre. Supervised descent method and its applications to face alignment. In Proc CVPR, pages 532-539, 2013), Squeezenet (F. N. Iandola, S. Han, M. W. Moskewicz, K. Ashraf, W. J. Dally, and K. Keutzer. Squeezenet: Alexnet-level accuracy with 50× fewer parameters and, 0.5 mb model size. arXiv preprint arXiv:1602.07360, 2016), Xception (F. Chollet. Xception: Deep learning with depthwise separable convolutions. In CVPR, pages 1251-1258, 2017), Shufflenetv1 (X. Zhang, X. Zhou, M. Lin, and J. Sun. Shufflenet: An extremely efficient convolutional neural network for mobile devices. In CVPR, 2018), Shufflenetv2 (N. Ma, X. Zhang, H.-T. Zheng, and J. Sun. Shufflenet v2: Practical guidelines for efficient cnn architecture design. arXiv preprint arXiv:1807.11164, 2018), Mobilenetv1 (A. G. Howard, M. Zhu, B. Chen, D. Kalenichenko, W. Wang, T. Weyand, M. Andreetto, and H. Adam. Mobilenets: Efficient convolutional neural networks for mobile vision applications. arXiv preprint arXiv:1704.04861, 2017), and Mobilenetv2 (M. Sandler, A. Howard, M. Zhu, A. Zhmoginov, and L.-C. Chen. Inverted residuals and linear bottlenecks: Mobile networks for classification, detection and segmentation. arXiv preprint arXiv:1801.04381, 2018).

With the parameters reduced to KB level, all light-weight baselines suffer significant recession of the accuracy (mean NME increasing), such as 4.40 (Mobilenetv1), 4.26 (Mobilenetv2), 4.93 (Shufflenetv1), and 4.32 (Shufflenetv2). Among the baselines specialized for large poses face alignment task, the NME of an example embodiment of Block Mobilenet is 8% lower than the state-of-the-art PCD-CNN. From Table 7, it can be observed that an example embodiment has an NME that is 25% lower when the yaw angle is less than 60°, but in the range of 60° to 90° an example embodiment of the model is not as good as PCD-CNN (A. Kumar and R. Chellappa. Disentangling 3d pose in a dendritic cnn for unconstrained 2d face alignment. arXiv preprint arXiv:1802.06713, 2018). A possible reason is the heat map softmax loss using PCD-CNN performs better than an $L_2$ loss applied on side faces (A. Kumar and R. Chellappa. Disentangling 3d pose in a dendritic cnn for unconstrained 2d face alignment. arXiv preprint arXiv:1802.06713, 2018). An example embodiment may further improve performance by using heatmap loss. From the CED curve 1291 (i.e., Block-Mobilenetv1) and CED curve 1292 (i.e., Block-Mobilenetv2) in FIGS. 12A-G, it is easy to see that a percentage of good cases of an example embodiment is the largest compared with baseline methods. To make a clear comparison with the baselines, only an example embodiment of Block Mobilenetv1 (M/N=3/2) and Block Mobilenetv2 (M/N=3/2) is disclosed in FIGS. 12A-G.

Time and Space Complexity Analysis

Time Complexity: Since face alignment methods are often used on mobile devices, which makes it important to be real-time without GPU support. Compared with those deep learning methods (R. Ranjan, V. M. Patel, and R. Chellappa. Hyperface: A deep multi-task learning framework for face detection, landmark localization, pose estimation, and gender recognition. IEEE Transactions on Pattern Analysis and Machine Intelligence, 2017, C. Bhagavatula, C. Zhu, K. Luu, and M. Savvides. Faster than real-time facial alignment: A 3d spatial transformer network approach in unconstrained poses. Proc. ICCV, page to appear, 2, 2017, X. Zhu, Z. Lei, X. Liu, H. Shi, and S. Z. Li. Face alignment across large poses: A 3d solution. In Proc CVPR, pages 146-155, 2016, A. Bulat and G. Tzimiropoulos. How far are we from solving the 2d & 3d face alignment problem? (and a dataset of 230,000 3d facial landmarks). In Computer Vision (ICCV), 2017 IEEE International Conference on, pages 1021-1030. IEEE, 2017, G. Hinton, O. Vinyals, and J. Dean. Distilling the knowledge in a neural network. arXiv preprint arXiv:1503.02531, 2015, G. Trigeorgis, P. Snape, M. A. Nicolaou, E. Antonakos, and S. Zafeiriou. Mnemonic descent method: A recurrent process applied for end-to-end face alignment. In Proc CVPR, pages 4177-4187, 2016), an example embodiment of Block Mobilenet has much better speed on both one core CPU and GPU. An example embodiment has speed that is ×4 of the state-of-the-art on CPU and ×18 on GPU. There are two reasons for such impressive speed. First, the light-weight depthwise convolution is fully used in an example embodiment of DSB. Second, the channels of each layer are reduced by half. The results are shown in Table 7. In the table, it is noticed that the SDM (X. Xiong and F. De la Torre. Supervised descent method and its applications to face alignment. In Proc CVPR, pages 532-539, 2013), ERT (V. Kazemi and J. Sullivan. One millisecond face alignment with an ensemble of regression trees. In Proc CVPR, pages 1867-1874, 2014) and ESR (X. Cao, Y. Wei, F. Wen, and J. Sun. Face alignment by explicit shape regression. International Journal of Computer Vision, 107 (2):177-190, 2014) have very impressive speed on CPU. The reason is all of these methods use hand-craft features. Such features are easy to compute by computers but have limited ability for representation. That is why their accuracies are not outstanding. For light-weight baselines, the ratio of speed to accuracy is used as the evaluation metric, the larger of which means the speed of the model is higher or the accuracy is better (lower mean NME). The results are visualized in FIG. 14.

Figure 14:
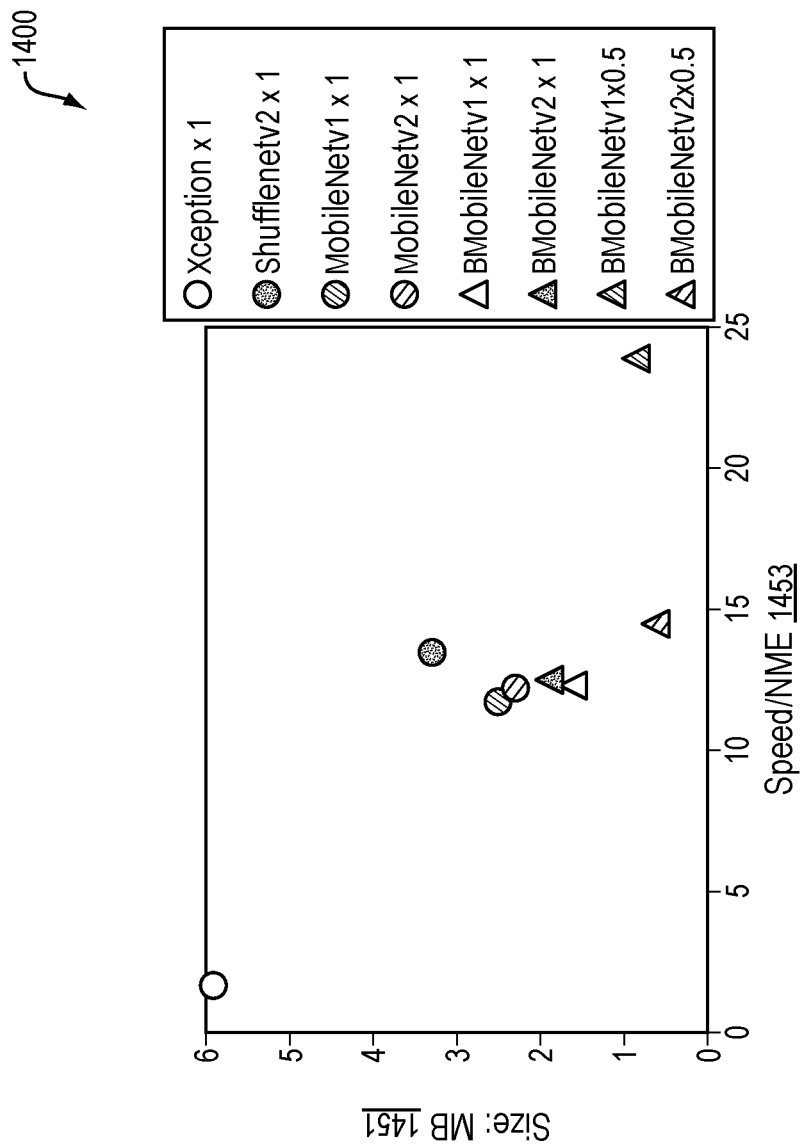
FIG. 14 is graph of an example embodiment of size versus a ratio of speed to mean normalized mean error (NME) for various models.

FIG. 14 is graph 1400 of an example embodiment of size 1451 versus a ratio 1453 of speed to mean NME for various models. The visualized comparison is on speed, accuracy, and parameters. The horizontal axis is the ratio of speed to mean NME, and the vertical axis is the size of the model. The model in the right bottom area has the best overall performance on the speed (on CPU), accuracy (mean NME), and size. Note that only models with NME larger than 4 were evaluated. However, some models, such as ERT, have very high ratio but very low accuracy. Thus, only models that have good performance on mean NME, which is larger than 4, were evaluated.

Space Complexity

For the applications on mobile devices, the memory size of the model should be small enough. From the Table 7, it can be observed that the smallest model of an example embodiment of Block Mobilenet is ×120 smaller than the smallest model in baseline deep learning methods. Besides, it is ×10 smaller than the smallest model in all baselines. The reason is that the light-weight depthwise convolution and small channels are used in an example embodiment of Block Mobilenet. The visualization results among the light-weight baselines is disclosed in FIG. 14. The model which has lower value on vertical axis has smaller storage size. It can be noticed that the example embodiment of B-Mobilenetv1 has smaller parameters than B-Mobilenetv2 when $\alpha=1$. The reason is the output module replaces the last two depthwise separable convolutions contain a large amount of parameters. The same replacement cannot be performed since the output of the last second bottleneck has only 80 feature maps, which is not sufficient to get accurate results. However, the example embodiment of B-Mobilenetv1 has larger parameters than the example embodiment of B-Mobilenetv2 when $\alpha=0.5$. The main reason is the increase of the parameters caused by concatenation affects more on straight structure than bottleneck structure.

Disclosed herein is an example embodiment of a basic depthwise separable block for better reducing the network parameters. In addition, an example embodiment of an output module specified for faces based on the spatial configuration on faces is disclosed. Based on Mobilenet, an example embodiment uses the basic block and the output module to build a light-weight Block Mobilenet. Amazingly, an example embodiment of Block Mobilenet had much lower parameters for 3D face alignment tasks on mobile devices. Moreover, this provided an effective method to decrease the parameters of deep networks for accelerating them in many mobile device applications. A set of experimental results verified that an example embodiment of Block-Mobilenet achieves lower error, faster speed, and smaller parameters than the state-of-the-art 3D face alignment methods. Compared with the state-of-the-art light-weight networks, an example embodiment of Block Mobilenet shows impressive ability of retaining performance when the model (e.g., neural network) size is in KB level. Different loss functions may be explored to improve the performance.

Figure 15:
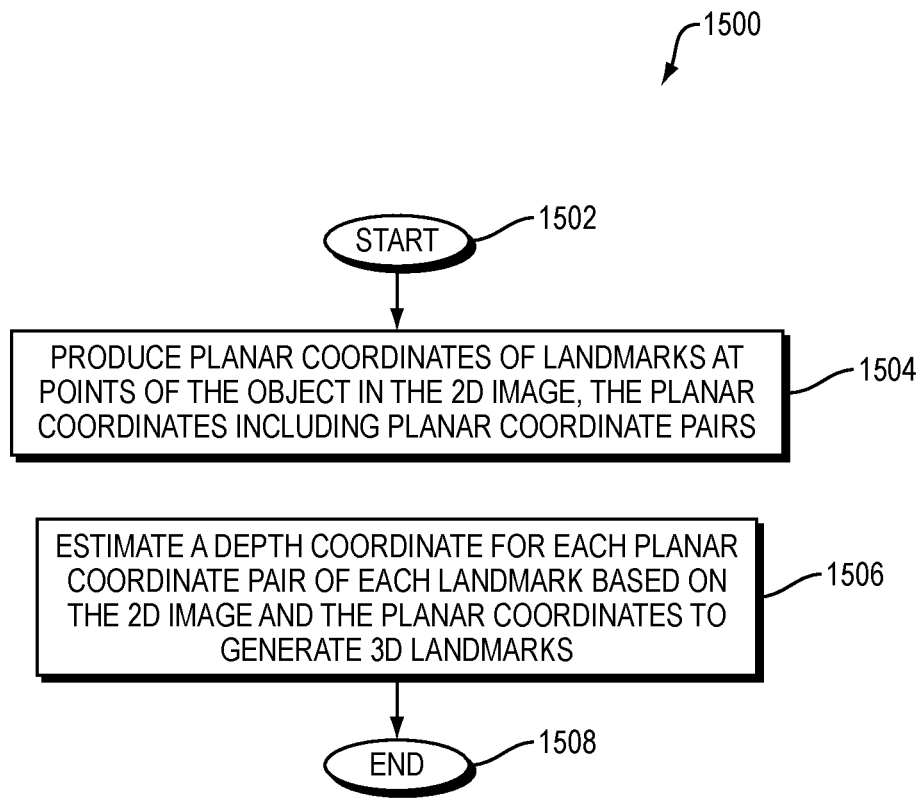
FIG. 15 is a flow diagram of an example embodiment of a method for generating 3D landmarks associated with an object in a 2D image.

FIG. 15 is a flow diagram 1500 of an example embodiment of a method for generating 3D landmarks associated with an object in a 2D image. The method begins (1502) and produces planar coordinates of landmarks at points of the object in the 2D image, the planar coordinates including planar coordinate pairs (1504). The method estimates a depth coordinate for each planar coordinate pair of each landmark based on the 2D image and the planar coordinates to generate the 3D landmarks (1506), and the method thereafter ends (1508), in the example embodiment.

The object may be a face in the 2D image. The 3D landmarks may be facial landmarks located at strongly and weakly constrained regions of the face. The strongly constrained regions may have fewer changes in a spatial distribution of the facial landmarks relative to the weakly constrained regions.

The method may further comprise applying the 3D landmarks for face alignment, virtual face makeup, face recognition, eye gaze tracking, face synthesis, or other face related application.

The producing may include employing a pairing of a depthwise convolutional block and pointwise convolutional block, the pointwise convolutional block receiving features output by the depthwise convolutional block, and outputting feature-generating-backbone features.

The producing may include performing depthwise convolution in series, each depthwise convolution in the series outputting respective features as a function of respective input; and concatenating respective features output from each of the depthwise convolutions of the series and outputting the feature-generating-backbone output features.

The series may include at least three depthwise convolutions. The producing may further include concatenating respective features output from each of the at least three depthwise convolutions.

The depthwise convolutions may include performing depthwise convolution at respective depthwise convolutional layers. The producing may further include employing batch normalization and a rectified linear unit (ReLU) activation function at the respective depthwise convolutional layer.

The pointwise convolutional block may perform pointwise convolutions in series. The producing may further include outputting respective features as a function of respective input at each pointwise convolution in the series.

The pointwise convolutions may include performing pointwise convolution at respective layers. The producing may further include employing batch normalization and a ReLU activation function at the respective layers.

The producing may further include employing a pointwise convolutional layer, the depthwise convolutional block receiving features from the pointwise convolutional layer and outputting the feature-generating-backbone output features.

The producing may further include employing a ReLU activation function at the pointwise convolutional layer.

The producing may further include employing a pointwise convolutional layer, the depthwise convolutional block receiving features from the pointwise convolutional layer; and adding all input to the pointwise convolutional layer to features output from the pointwise convolutional block and outputting the feature-generating-backbone output features, wherein a stride value of the depthwise convolutional block is one.

The method may further comprise outputting the feature-generating-backbone features from the pointwise convolutional block to a first regressor, the first regressor including at least one first sequential pairing of a pointwise convolutional layer and a depthwise convolutional layer for a first respective dimension of a coordinate system; outputting the feature-generating-backbone features from the pointwise convolutional block to a second regressor, the second regressor including at least one second sequential pairing of a pointwise convolutional layer and a depthwise convolutional layer for a second respective dimension of the coordinate system, the second regressor having fewer channels of outputs than the first regressor, the at least one second sequential pairing being equal in number as the at least one first sequential pairing; concatenating features output from each depthwise convolutional layer of the first and second regressors to produce concatenated features; and inputting the concatenated features to an output pointwise convolutional layer and outputting the planar coordinates of the 3D landmarks.

The estimating may include inputting feature maps of RGB pixel information of the 2D image and the planar coordinates to alternating layers of pointwise and depthwise convolutional layers, the depthwise convolutional layers each downsampling received features; and combining features of weighted pixels associated with the landmarks and outputting a depth coordinate associated with each landmark.

Figure 16:
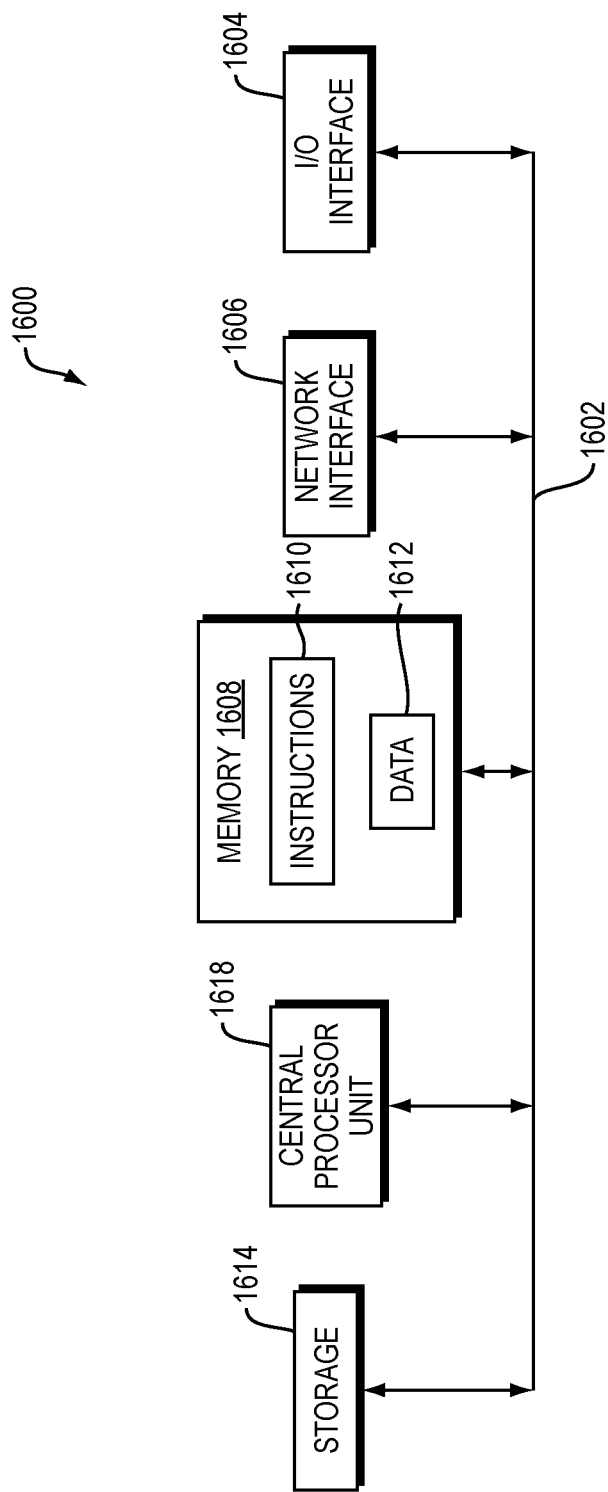
FIG. 16 is a block diagram of an example internal structure of a computer optionally within an embodiment disclosed herein.

FIG. 16 is a block diagram of an example of the internal structure of a computer 1600 in which various embodiments of the present disclosure may be implemented. The computer 1600 contains a system bus 1602, where a bus is a set of hardware lines used for data transfer among the components of a computer or processing system. The system bus 1602 is essentially a shared conduit that connects different elements of a computer system (e.g., processor, disk storage, memory, input/output ports, network ports, etc.) that enables the transfer of information between the elements. Coupled to the system bus 1602 is an I/O device interface 1604 for connecting various input and output devices (e.g., keyboard, mouse, displays, printers, speakers, etc.) to the computer 1600. A network interface 1606 allows the computer 1600 to connect to various other devices attached to a network. Memory 1608 provides volatile or non-volatile storage for computer software instructions 1610 and data 1612 that may be used to implement embodiments of the present disclosure, where the volatile and non-volatile memories are examples of non-transitory media. Disk storage 1614 provides non-volatile storage for computer software instructions 1610 and data 1612 that may be used to implement embodiments of the present disclosure. A central processor unit 1618 is also coupled to the system bus 1602 and provides for the execution of computer instructions.

Further example embodiments disclosed herein may be configured using a computer program product; for example, controls may be programmed in software for implementing example embodiments. Further example embodiments may include a non-transitory computer-readable medium containing instructions that may be executed by a processor, and, when loaded and executed, cause the processor to complete methods described herein. It should be understood that elements of the block and flow diagrams may be implemented in software or hardware, such as via one or more arrangements of circuitry of FIG. 16, disclosed above, or equivalents thereof, firmware, a combination thereof, or other similar implementation determined in the future.

For example, it should be understood that neural network architectural structures labelled with terms such as, "detector,", "estimator," "backbone," "block," "stack," "concatenator," "layer," "element," "regressor," etc., in block and flow diagrams disclosed herein, such as, FIGS. 1A, 1B, 2-6, 7A, 7B, 8, 9, 15, etc., disclosed above, may be implemented in software/firmware, such as via one or more arrangements of circuitry of FIG. 16, disclosed above, equivalents thereof, integrated circuit(s) (e.g., field programmable gate array (FPGA), application-specific integrated circuit (ASIC), etc.), or combination thereof.

In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A system for generating 3D landmarks associated with an object in a 2D image, the system comprising:
   a detector configured to produce planar coordinates of landmarks at points of the object in the 2D image, the planar coordinates including planar coordinate pairs; and
   a depth coordinate estimator configured to receive the 2D image and the planar coordinates and to estimate a depth coordinate for each planar coordinate pair of each landmark to generate the 3D landmarks, wherein the depth coordinate estimator includes:
      alternating layers of pointwise and depthwise convolutional layers, the depthwise convolutional layers each downsampling received features, an input to the alternating layers including feature maps of RGB pixel information of the 2D image and the planar coordinates; and
      a pooling layer configured to receive features of weighted pixels associated with the landmarks and output a depth coordinate associated with each landmark.

2. The system of claim 1, wherein the object is a face in the 2D image and wherein the 3D landmarks are facial landmarks located at strongly and weakly constrained regions of the face, wherein the strongly constrained regions have fewer changes in a spatial distribution of the facial landmarks relative to the weakly constrained regions.

3. The system of claim 2, wherein the system is configured to apply the 3D landmarks for face alignment, virtual face makeup, face recognition, eye gaze tracking, face synthesis, or other face related application.

4. The system of claim 1, wherein the detector includes:
   a feature-generating backbone including a neural network element employing a pairing of a depthwise convolutional block and pointwise convolutional block, the pointwise convolutional block configured to receive features output by the depthwise convolutional block and output feature-generating-backbone output features.

5. The system of claim 4, wherein the depthwise convolutional block includes:
   a depthwise stack including depthwise convolutional elements arranged in series, each depthwise convolutional element in the series configured to output respective features as a function of respective input; and
   a concatenator having inputs coupled to outputs of each of the depthwise convolutional elements of the depthwise stack to receive each of the respective features output and configured to produce a concatenated output with each of the respective features.

6. The system of claim 5, wherein the series includes at least three depthwise convolutional elements and wherein the inputs of the concatenator are coupled to outputs of each of the at least three depthwise convolutional elements.

7. The system of claim 5, wherein the depthwise convolutional elements include a respective depthwise convolutional layer and wherein the respective depthwise convolutional layer includes batch normalization and a rectified linear unit (ReLU) activation function.

8. The system of claim 4, wherein the pointwise convolutional block includes pointwise convolutional elements arranged in series, each pointwise convolutional element in the series configured to output respective features as a function of respective input.

9. The system of claim 8, wherein the pointwise convolutional elements include a respective pointwise convolutional layer and wherein the respective pointwise convolutional layer includes batch normalization and a ReLU activation function.

10. The system of claim 4, wherein the neural network element is further configured to employ a pointwise convolutional layer, the depthwise convolutional block configured to receive features from the pointwise convolutional layer and output the feature-generating-backbone output features.

11. The system of claim 10, wherein the pointwise convolutional layer includes batch normalization and a ReLU activation function.

12. The system of claim 10, wherein the neural network element is further configured to: employ a pointwise convolutional layer, the depthwise convolutional block configured to receive features from the pointwise convolutional layer; and
   employ an add operator configured to receive all input to the pointwise convolutional layer and features output from the pointwise convolutional block and output the feature-generating-backbone output features, wherein a stride value of the depthwise convolutional block is one.

13. The system of claim 10, wherein the detector further includes:
   a first regressor configured to receive features output by the feature-generating backbone, the first regressor including at least one first sequential pairing of a pointwise convolutional layer and a depthwise convolutional layer for a first respective dimension of a coordinate system;
   a second regressor configured to receive the features output by the feature-generating backbone, the second regressor including at least one second sequential pairing of a pointwise convolutional layer and a depthwise convolutional layer for a second respective dimension of the coordinate system, the second regressor having fewer channels of outputs than the first regressor, the at least one second sequential pairing being equal in number as the at least one first sequential pairing;
   a concatenator configured to concatenate features output from each depthwise convolutional layer of the first and second regressors and to output concatenated features; and
   an output pointwise convolutional layer and a pooling layer configured to receive the concatenated features output from the concatenator and produce the planar coordinates for the 3D landmarks.

14. A method for generating 3D landmarks associated with an object in a 2D image, the method comprising:
producing planar coordinates of landmarks at points of the object in the 2D image, the planar coordinates including planar coordinate pairs; and
estimating a depth coordinate for each planar coordinate pair of each landmark based on the 2D image and the planar coordinates to generate the 3D landmarks, wherein the estimating includes:
inputting feature maps of RGB pixel information of the 2D image and the planar coordinates to alternating layers of pointwise and depthwise convolutional layers, the depthwise convolutional layers each downsampling received features; and
combining features of weighted pixels associated with the landmarks and outputting a depth coordinate associated with each landmark.

15. The method of claim 14, wherein the object is a face in the 2D image and wherein the 3D landmarks are facial landmarks located at strongly and weakly constrained regions of the face, wherein the strongly constrained regions have fewer changes in a spatial distribution of the facial landmarks relative to the weakly constrained regions.

16. The method of claim 15, wherein the method further comprises applying the 3D landmarks for face alignment, virtual face makeup, face recognition, eye gaze tracking, face synthesis, or other face related application.

17. The method of claim 14, wherein the producing includes:
employing a pairing of a depthwise convolutional block and pointwise convolutional block, the pointwise convolutional block receiving features output by the depthwise convolutional block; and
outputting feature-generating-backbone features.

18. The method of claim 17, wherein the producing includes:
performing depthwise convolution in series, each depthwise convolution in the series outputting respective features as a function of respective input; and
concatenating respective features output from each of the depthwise convolutions of the series and outputting the feature-generating-backbone output features.

19. The method of claim 18, wherein the series includes at least three depthwise convolutions and wherein the producing further includes concatenating respective features output from each of the at least three depthwise convolutions.

20. The method of claim 18, wherein the depthwise convolutions include performing depthwise convolution at respective depthwise convolutional layers, and wherein the producing further includes employing batch normalization and a rectified linear unit (ReLU) activation function at the respective depthwise convolutional layer.

21. The method of claim 17, wherein the pointwise convolutional block performs pointwise convolutions in series, and wherein the producing further includes outputting respective features as a function of respective input at each pointwise convolution in the series.

22. The method of claim 21, wherein the pointwise convolutions include performing pointwise convolution at respective layers, and wherein the producing further includes employing batch normalization and a ReLU activation function at the respective layers.

23. The method of claim 17, wherein the producing further includes employing a pointwise convolutional layer, the depthwise convolutional block receiving features from the pointwise convolutional layer and outputting the feature-generating-backbone output features.

24. The method of claim 23, wherein the producing further includes employing batch normalization a ReLU activation function at the pointwise convolutional layer.

25. The method of claim 17, wherein the producing further includes:
employing a pointwise convolutional layer, the depthwise convolutional block receiving features from the pointwise convolutional layer; and
adding all input to the pointwise convolutional layer to features output from the pointwise convolutional block and outputting the feature-generating-backbone output features, wherein a stride value of the depthwise convolutional block is one.

26. The method of claim 17, further comprising:
outputting the feature-generating-backbone features from the pointwise convolutional block to a first regressor, the first regressor including at least one first sequential pairing of a pointwise convolutional layer and a depthwise convolutional layer for a first respective dimension of a coordinate system;
outputting the feature-generating-backbone features from the pointwise convolutional block to a second regressor, the second regressor including at least one second sequential pairing of a pointwise convolutional layer and a depthwise convolutional layer for a second respective dimension of the coordinate system, the second regressor having fewer channels of outputs than the first regressor, the at least one second sequential pairing being equal in number as the at least one first sequential pairing;
concatenating features output from each depthwise convolutional layer of the first and second regressors to produce concatenated features; and
inputting the concatenated features to an output pointwise convolutional layer and outputting the planar coordinates of the 3D landmarks.

27. A non-transitory computer-readable medium for generating 3D landmarks associated with an object in a 2D image, the non-transitory computer-readable medium having encoded thereon a sequence of instructions which, when loaded and executed by at least one processor, causes the at least one processor to:
produce planar coordinates of landmarks at points of the object in the 2D image, the planar coordinates including planar coordinate pairs; and
estimate a depth coordinate for each planar coordinate pair of each landmark based on the 2D image and the planar coordinates to generate the 3D landmarks, wherein to estimate the depth coordinate, the sequence of instructions further causes the at least one processor to:
input feature maps of RGB pixel information of the 2D image and the planar coordinates to alternating layers of pointwise and depthwise convolutional layers, the depthwise convolutional layers each downsampling received features; and
combine features of weighted pixels associated with the landmarks and outputting a depth coordinate associated with each landmark.

28. A neural network, comprising:
a feature-generating backbone including a neural network element employing a pairing of a depthwise convolutional block and pointwise convolutional block;

a first regressor configured to receive features output by the feature-generating backbone, the first regressor including at least one first sequential pairing of a pointwise convolutional layer and a depthwise convolutional layer for a first respective dimension of a coordinate system;

a second regressor configured to receive the features output by the feature-generating backbone, the second regressor including at least one second sequential pairing of a pointwise convolutional layer and a depthwise convolutional layer for a second respective dimension of the coordinate system, the second regressor having fewer channels of outputs than the first regressor, the at least one second sequential pairing being equal in number as the at least one first sequential pairing;

a concatenator configured to concatenate features by concatenating features output from each depthwise convolutional layer of the first and second regressors and to output concatenated features; and an output pointwise convolutional layer and pooling layer configured to receive the concatenated features output from the concatenator and produce planar coordinates for landmarks associated with input to the feature-generating backbone.

29. The neural network of claim 28, wherein the neural network element further employs:

an input pointwise convolutional layer, wherein the depthwise convolutional block is configured to receive features from the input pointwise convolutional layer and wherein the pointwise convolutional block is configured to receive features output from the depthwise convolutional block and output feature-generating-backbone output features; and wherein the first and second regressors are configured to receive the feature-generating-backbone output features.

30. The neural network element of claim 28 wherein the neural network element further employs:

an input pointwise convolutional layer, wherein the depthwise convolutional block is configured to receive features from the input pointwise convolutional layer and wherein the pointwise convolutional block is configured to receive features output from the depthwise convolutional block;

an add operator configured to receive all input to the input pointwise convolutional layer and features output from the pointwise convolutional block and output feature-generating-backbone output features, wherein a stride value of the depthwise convolutional block is one; and wherein the first and second regressors are configured to receive the feature-generating-backbone output features.

31. A neural network, comprising:

alternating layers of pointwise and depthwise convolutional layers, the depthwise convolutional layers each downsampling received features, an input to the alternating layers including feature maps of RGB pixel information of a 2D image and landmarks associated with the 2D image; and a pooling layer configured to receive features of weighted pixels associated with the landmarks and output a depth coordinate associated with each landmark.

* * * * *